(12) United States Patent
Castañeda et al.

(10) Patent No.: US 11,092,998 B1
(45) Date of Patent: Aug. 17, 2021

(54) EYEWEAR DEVICE WITH FINGERPRINT SENSOR FOR USER INPUT

(71) Applicants: Julio Cesar Castañeda, Redondo Beach, CA (US); Rajeev Ramanath, Torrance, CA (US)

(72) Inventors: Julio Cesar Castañeda, Redondo Beach, CA (US); Rajeev Ramanath, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/242,240

(22) Filed: Jan. 8, 2019

Related U.S. Application Data

(60) Provisional application No. 62/616,753, filed on Jan. 12, 2018.

(51) Int. Cl.
| | |
|---|---|
| *G06F 1/16* | (2006.01) |
| *G02C 7/02* | (2006.01) |
| *G06K 9/00* | (2006.01) |
| *G06F 1/3293* | (2019.01) |

(52) U.S. Cl.
CPC .............. *G06F 1/163* (2013.01); *G02C 7/02* (2013.01); *G06F 1/3293* (2013.01); *G06K 9/001* (2013.01); *G06K 9/00013* (2013.01)

(58) Field of Classification Search
CPC ......... G06F 1/163; G06F 1/3293; G02C 7/02; G06K 9/00013; G06K 9/001
See application file for complete search history.

(56) References Cited

U.S. PATENT DOCUMENTS

| | | | |
|---|---|---|---|
| 9,649,052 B2 | 5/2017 | Sales et al. | |
| 9,678,338 B1 | 6/2017 | Bamberger et al. | |
| 9,870,716 B1* | 1/2018 | Rao .................... | G09B 19/0092 |
| 2010/0075631 A1* | 3/2010 | Black ..................... | G07C 9/257 |
| | | | 455/410 |
| 2016/0269411 A1* | 9/2016 | Malachi .................. | H04L 63/10 |
| 2018/0052558 A1* | 2/2018 | Wang .................... | G06F 3/0416 |
| 2018/0060633 A1* | 3/2018 | Lin ....................... | G06K 9/0002 |

* cited by examiner

*Primary Examiner* — Kenneth B Lee, Jr.
(74) *Attorney, Agent, or Firm* — Culhane Meadows PLLC; Stephen J. Weed

(57) ABSTRACT

A system comprises an eyewear device that includes a frame, a temple connected to a lateral side of the frame, a fingerprint sensor, and a sensing circuit. The fingerprint sensor includes an input surface to receive input of a finger skin surface. The sensing circuit is configured to track a pattern of fingerprint ridges of the finger skin surface on the input surface. Execution of programming by a processor configures the system to perform functions to track, via the sensing circuit, the pattern of fingerprint ridges of the finger skin surface on the input surface; generate a fingerprint image having the tracked pattern of fingerprint ridges; extract fingerprint features from the fingerprint image; and authorize the user to utilize the eyewear device based on the extracted fingerprint features.

19 Claims, 12 Drawing Sheets

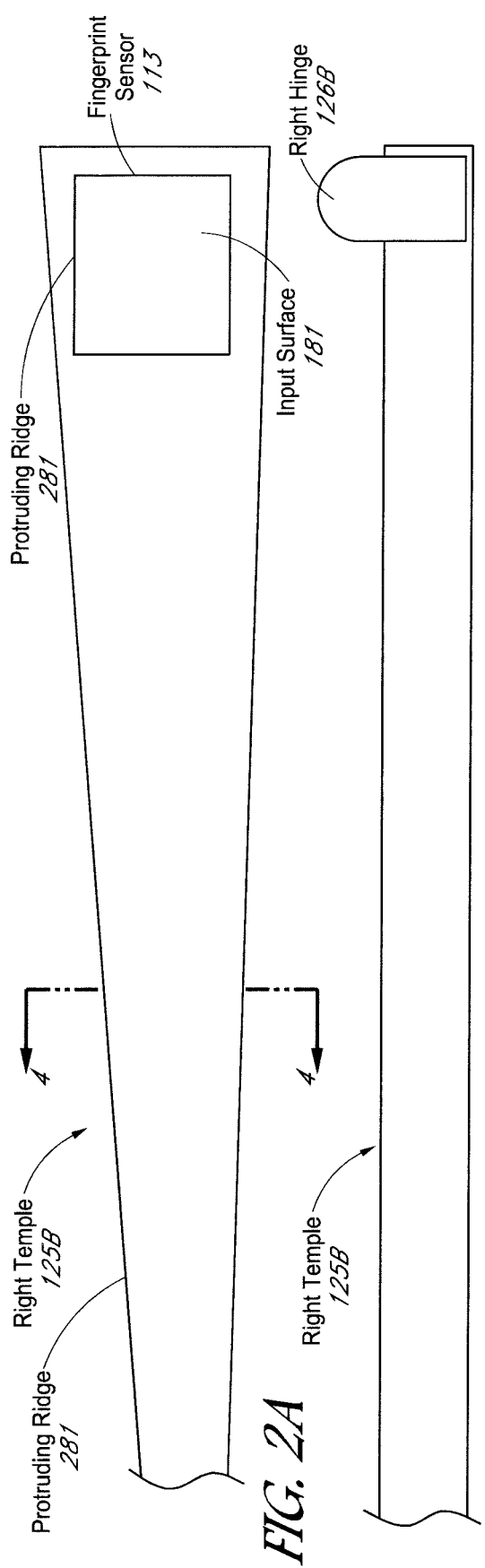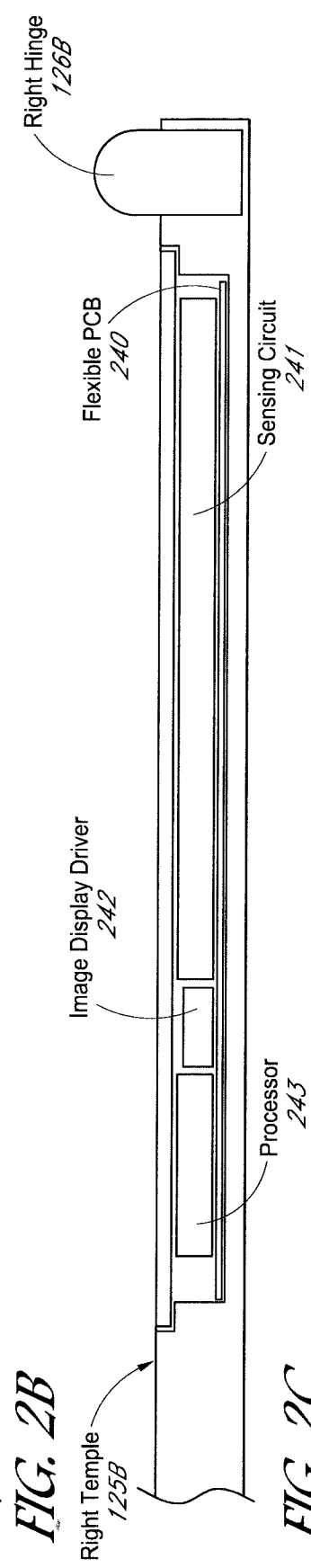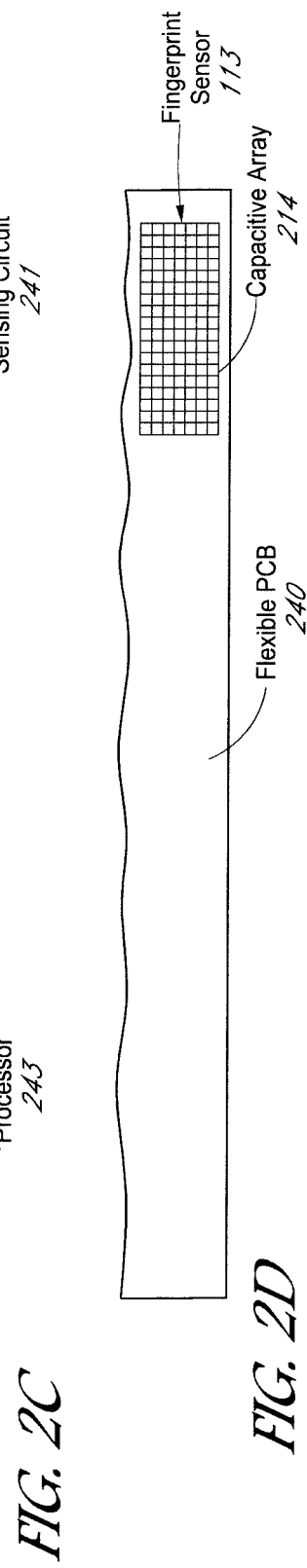

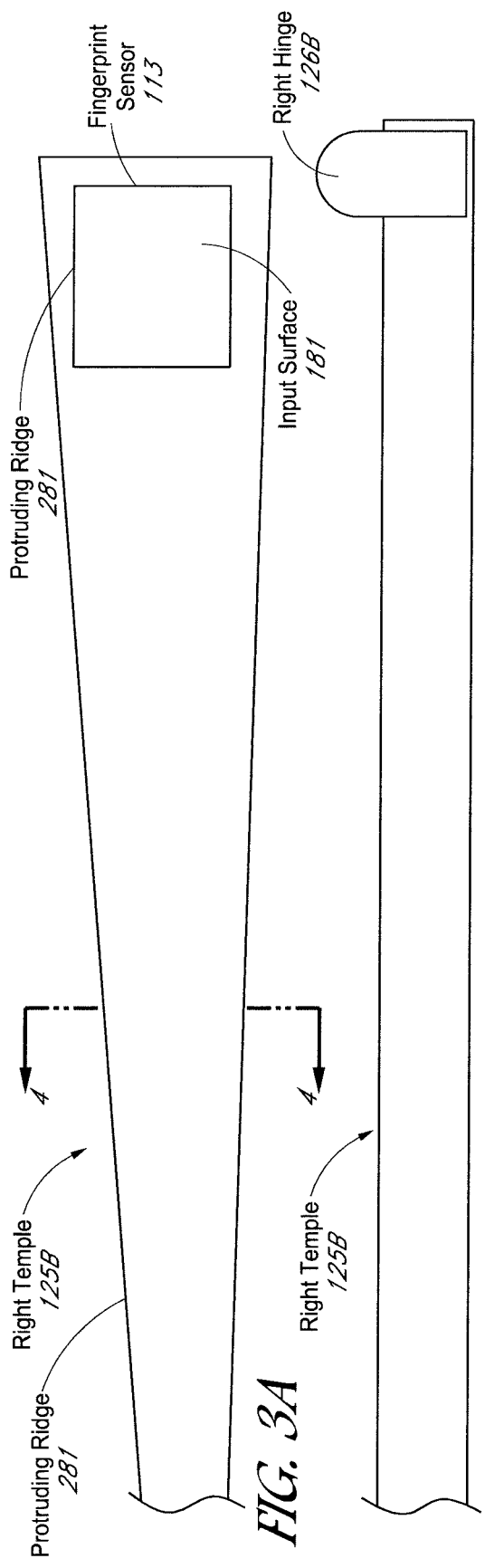
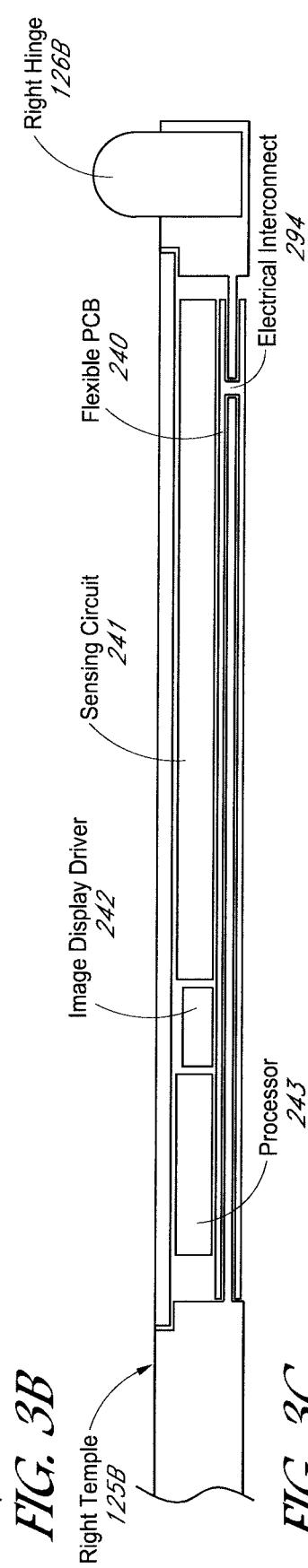
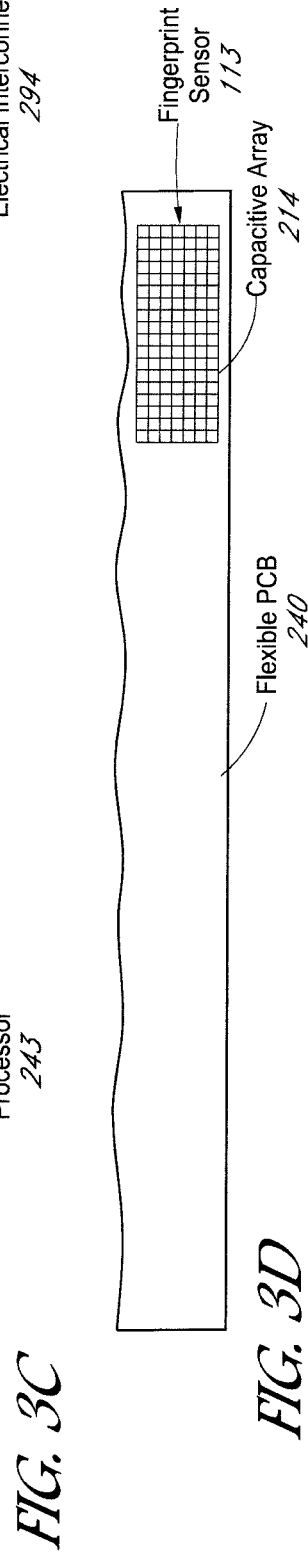
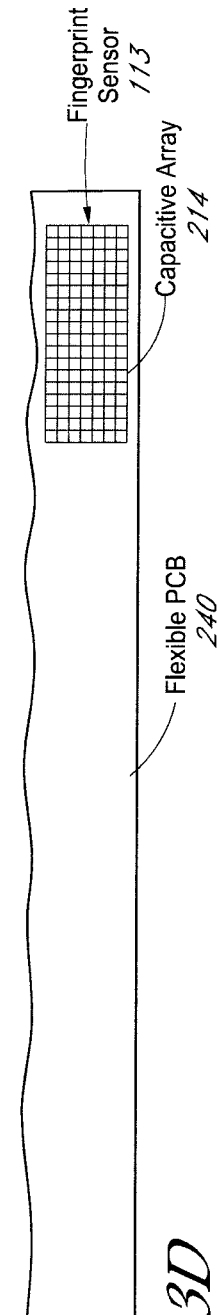
FIG. 3A
FIG. 3B
FIG. 3C
FIG. 3D

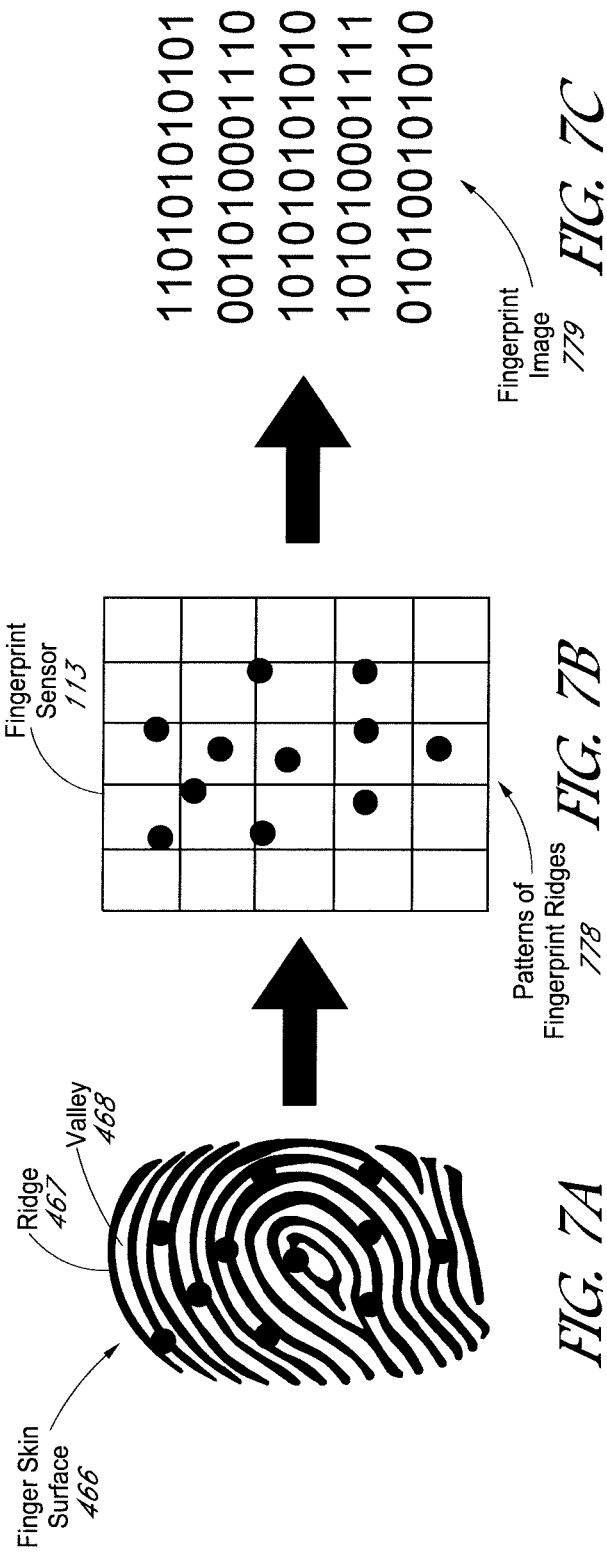
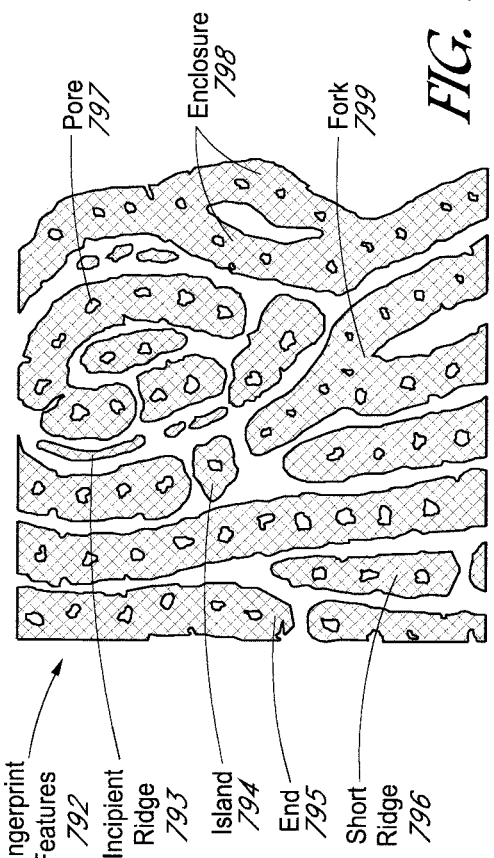

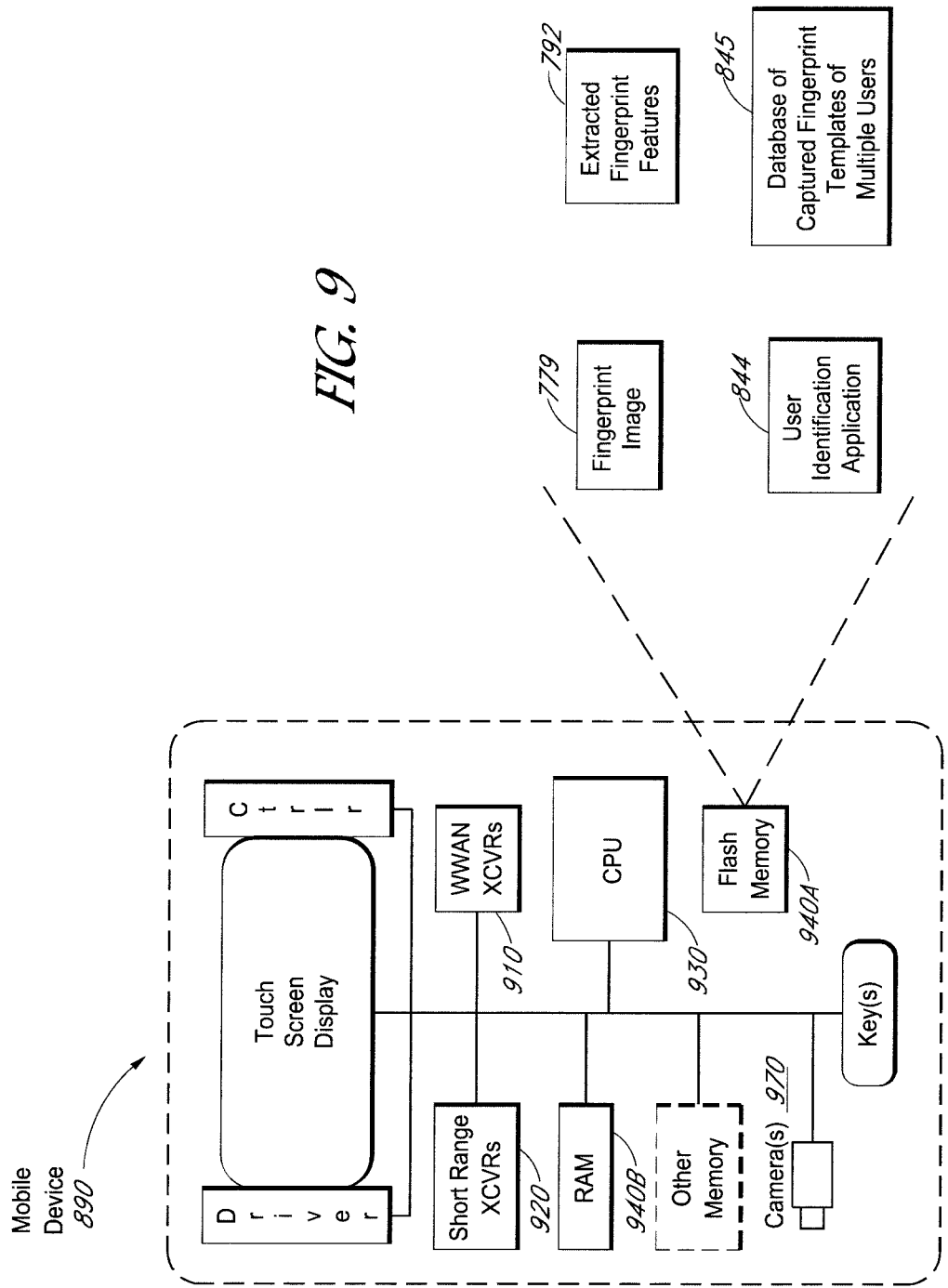

EYEWEAR DEVICE WITH FINGERPRINT SENSOR FOR USER INPUT

CROSS-REFERENCE TO RELATED APPLICATIONS

This application is entitled to priority under 35 U.S.C. § 119(e) to U.S. Provisional Patent Application No. 62/616,753, filed Jan. 12, 2018, which application is hereby incorporated herein by reference in its entirety.

TECHNICAL FIELD

The present subject matter relates to eyewear devices, e.g., smart glasses, and, more particularly, to eyewear devices with fingerprint sensors for user input, for example, authorization (e.g., security, identification, or access).

BACKGROUND

Portable eyewear devices, such as smartglasses, headwear, and headgear available today integrate lenses and cameras. Users of such portable eyewear devices may share such eyewear devices with friends and family members so that other users can borrow the eyewear device to capture images with the integrated camera.

Verifying the identity of the specific user of the portable eyewear device can be useful. As various software applications become more prevalent in such eyewear devices, it may be useful for such applications to check the identity of the user for security purposes.

Unfortunately, size limitations and the form factor of an eyewear device can make security difficult to incorporate into the eyewear device. The available area for placement of security sensors on the eyewear device is limited. Further, due to the small form factor of the eyewear device, manipulation and interacting with, for example, displayed content on an image display, via a navigation sensor, is cumbersome.

BRIEF DESCRIPTION OF THE DRAWINGS

The drawing figures depict one or more implementations, by way of example only, not by way of limitations. In the figures, like reference numerals refer to the same or similar elements.

FIG. 2A shows a side view of a temple of the eyewear device of FIGS. 1A-D depicting a capacitive type fingerprint sensor example.

FIG. 2B illustrates an external side view of a portion of the temple of the eyewear device of FIGS. 1A-D and 2A.

FIG. 2C illustrates an internal side view of the components of the portion of temple of the eyewear device of FIGS. 1A-D and 2B with a cross-sectional view of a circuit board with the fingerprint sensor, a sensing circuit, an image display driver, and a processor.

FIG. 2D depicts a capacitive array pattern formed on the circuit board of FIG. 2C to receive a finger skin surface inputted from the user.

FIG. 3A shows an external side view of a temple of the eyewear device of FIGS. 1A-D depicting another capacitive type fingerprint sensor.

FIG. 3B illustrates an external side view of a portion of the temple of the eyewear device of FIGS. 1A-D and 3A.

FIG. 3C illustrates an internal side view of the components of the portion of temple of the eyewear device of FIGS. 1A-D and 3B with a cross-sectional view of a circuit board with the fingerprint sensor, a sensing circuit, an image display driver, and a processor.

FIG. 3D depicts the capacitive array pattern formed on the circuit board of FIG. 3C to receive the finger skin surface inputted from the user.

FIGS. 7A, 7B, 7C, and 7D show operation of the system that includes the eyewear device 100 with the fingerprint sensor examples of FIGS. 1A-D, 4A-B, 5, and 6.

FIG. 9 shows an example of a hardware configuration for the mobile device of the fingerprint sensor system of FIG. 8, in simplified block diagram form.

DETAILED DESCRIPTION

Figure 1A:
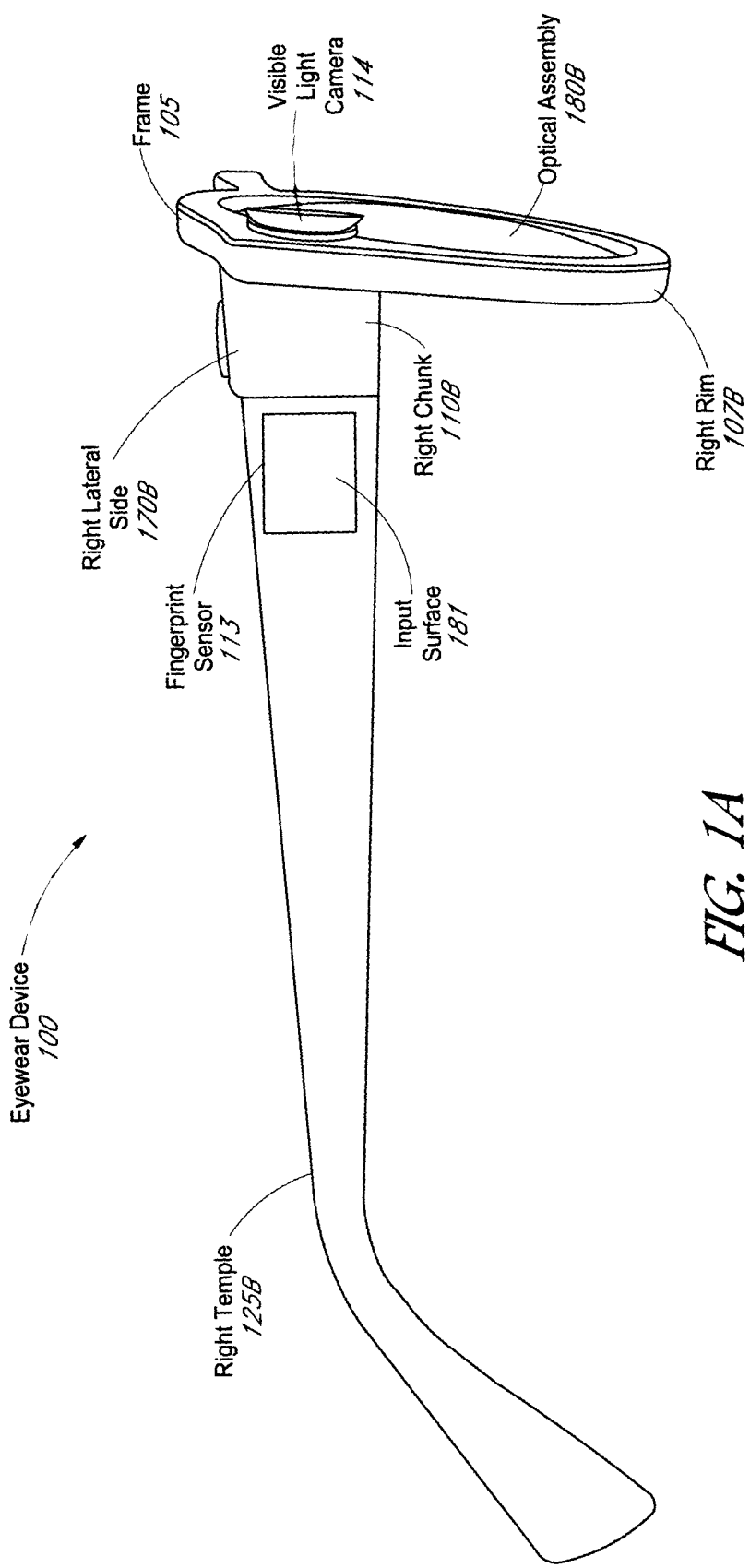
FIG. 1A is a side view of an example hardware configuration of an eyewear device, which includes a fingerprint sensor on a temple, for use in authorizing a user to utilize the eyewear device based on extracted fingerprint features.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a fingerprint sensor such as shown in any of the drawings, are given by way of example only, for illustration and discussion purposes. In operation for a particular fingerprint sensing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any fingerprint sensor or component of a fingerprint sensor constructed as otherwise described herein.

In an example, a system includes an eyewear device. The eyewear device includes a frame, a temple connected to a lateral side of the frame, and a fingerprint sensor including an input surface to receive input of a finger skin surface. The eyewear device further includes a sensing circuit integrated into or connected to the fingerprint sensor. The sensing circuit tracks a pattern of fingerprint ridges of the finger skin surface on the input surface. The system further includes a processor coupled to the eyewear device and connected to the sensing circuit, a memory accessible to the processor, and programming in the memory.

Execution of the programming by the processor configures the system to perform functions, including functions to track, via the sensing circuit, the pattern of fingerprint ridges of the finger skin surface on the input surface. The execution of the programming by the processor further configures the system to generate a fingerprint image having the tracked pattern of fingerprint ridges, extract fingerprint features from the fingerprint image, and authorize the user to utilize the eyewear device based on the extracted fingerprint features.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view of an example hardware configuration of an eyewear device 100, which includes a fingerprint sensor 113 on a temple 125B, for use in a system for authorizing (e.g., identifying) a user of the eyewear device 100. In some examples, the fingerprint sensor 113 includes a capacitive array, an optical scanner, or an ultrasonic scanner. The fingerprint sensor 113 captures an electronic image of a human fingerprint through various physical sensors, including capacitive, optical, acoustic (e.g., ultrasound), pressure, etc. The fingerprint sensor 113 is connected to the frame 105, the temple 125B, or the chunk 110B, which may include a circuit board (e.g., flexible printed circuit board) connected to the fingerprint sensor 113.

In an embodiment, user authorization establishes globally unique and unambiguous identifiers of the fingerprint, which serves to distinguish a discrete individual from other like and unlike users. Although identification can be unique, in other embodiments, the identification establishes that the user is part of a group of users. In response to identification as part of a group, the user can be provided permissions to access, control, or utilize, one more executable software applications or hardware features (e.g., a visible light camera) of the eyewear device 100.

Although not shown in FIGS. 1A-D, the eyewear device 100 is coupled to a processor and a memory, for example in the eyewear device 100 itself or another part of the system. Subsequent processing by the eyewear device 100 or the system, for example, using a coupled memory and processor in the system to process the extracted fingerprint features, identifies the unique pattern of the user's fingerprint and thus the particular user of the eyewear device 100 for identity verification. A user identification algorithm uses mathematical and statistical algorithms to allow for pattern recognition of the extracted fingerprint features to identify the user by comparing against captured fingerprint templates which are digital templates encoded from extracted fingerprint features.

A fingerprint is an impression left by the friction ridges of a human fingerprint, which is constructed of ridge units with various shapes, sizes, and alignments. The fingerprint sensor 113 is an electronic device used to capture and generate a digital image of the fingerprint, known as a live scan. The generated fingerprint image is digitally processed to create the extracted fingerprint features and create a biometric template of the fingerprint image, which is stored in the database of captured fingerprint templates of multiple users and is used for matching. When a user attempts to the use the eyewear device 100, the eyewear device 100 checks to compare a new live scan of the fingerprint image of the user against the database to authorize the user to utilize the eyewear device 100 based on extracted fingerprint features from the new live scan.

The extracted fingerprint features can be fingerprint friction ridge details, which are detail-rich, intricate structures of the fingerprint that are visible externally. Fingerprint friction ridge details can be generally described in a hierarchical order at three different levels, namely, level 1 (ridge pattern), level 2 (minutia points), or level 3 (pores and ridge contours). In some examples, only level 1 and level 2 features may be used depending on the resolution of the fingerprint sensor 113. For example, capacitive and optical type fingerprint sensors may provide level 1 and level 2 extracted fingerprint features; whereas, ultrasonic type fingerprint sensors may provide level, level 2, and level 3 extracted fingerprint features with depth sensed information in a third dimension (Z axis) to authenticate the user.

Fingerprint authentication typically includes verifying a match between two human fingerprints to identify a user and verify the user's identity, for example, based on correlation-based matching, minutiae-based matching, ridge feature-based matching, or algorithms that are a combination thereof. The extracted fingerprint features are aggregate characteristics of ridges and minutia points within the ridges. For example, the three patterns of fingerprint ridges include an arch (e.g., arch or tented arch) which is where the ridge enters from one side of the finger, rises in the center forming an arc, and then exits the other side of the finger. A second fingerprint ridge pattern is a loop (e.g., left loop, right loop, double loop) in which the ridge enters from one side of the finger, forms a curve, and then exits on that same side. A third fingerprint ridge pattern is a whorl in which the ridge forms circularly around a central point of the finger.

The three minutia features of fingerprint ridges are ridge ending (e.g., line-unit, line fragment), bifurcation, and short ridge (or dot). Ridge ending is the point at which the ridge terminates, bifurcations are points at which a single ridge splits into two ridges, and the short ridges (or dots) are ridges which are significantly shorter than the average ridge length of the fingerprint, such as an eye or a hook. Level three features can include pores, line shape, incipient ridges, creases, warts or scars.

To initially set up the user in the system, a pattern of fingerprint ridges of the finger skin surface inputted from the user is tracked and a fingerprint image is generated with the tracked patterns of fingerprint ridges. Fingerprint features are extracted from the fingerprint image and can be stored in a database of captured fingerprint templates, which includes digital templates of extracted features from fingerprints of multiple users. The system may then subsequently compare extracted fingerprint features to this database to uniquely identify the user. In an example, when the user is utilizing an eyewear device for the first time, an aggregate fingerprint image is generated capturing one, two, three, or more fingerprint images of the tracked patterns of fingerprint features of different finger skin surfaces of the user's finger. If this is the first time the user has used the system, the system will find no previously captured fingerprint template exists in the database that matches the current extracted fingerprint features. In response to finding no matching captured fingerprint template exists, the system updates the database to store the extracted fingerprint features derived from a generated fingerprint image of the first time user.

During a subsequent use (e.g., the live scan) of the eyewear device at a later time, the updated database with the digitized fingerprint templates that were previously stored in the database are analyzed using algorithms. The algorithms employ mathematical and statistical techniques for pattern recognition to determine whether extracted fingerprint features derived from the subsequently generated fingerprint image of that same user or a different user of the eyewear device 100 match the previously captured fingerprint templates that are stored and exist in the database. If a match is found, the identity of the user is verified (e.g., known) and corresponding user account information is retrieved. In one example, a chat application stored on the eyewear device 100 or a paired mobile device may be executed by a processor. The executing chat application may utilize the corresponding user account information to post or send images and videos captured by a visible light to camera 114 of the eyewear device 199 to the user's account and deliver the images and videos captured by the visible light camera 114 to contacts or associated groups of the verified user in the chat application. Although the above example describes verifying the identity of the user as knowing their identity or identifying an associated user account, some embodiments can include determining that the same person has used the eyewear device before without specifically knowing the identify or account information of the user. It should be understood that the foregoing functionality can be embodied in programming instructions of a user identification application found in one or more components of the system as further described in FIG. 8.

Figure 1B:
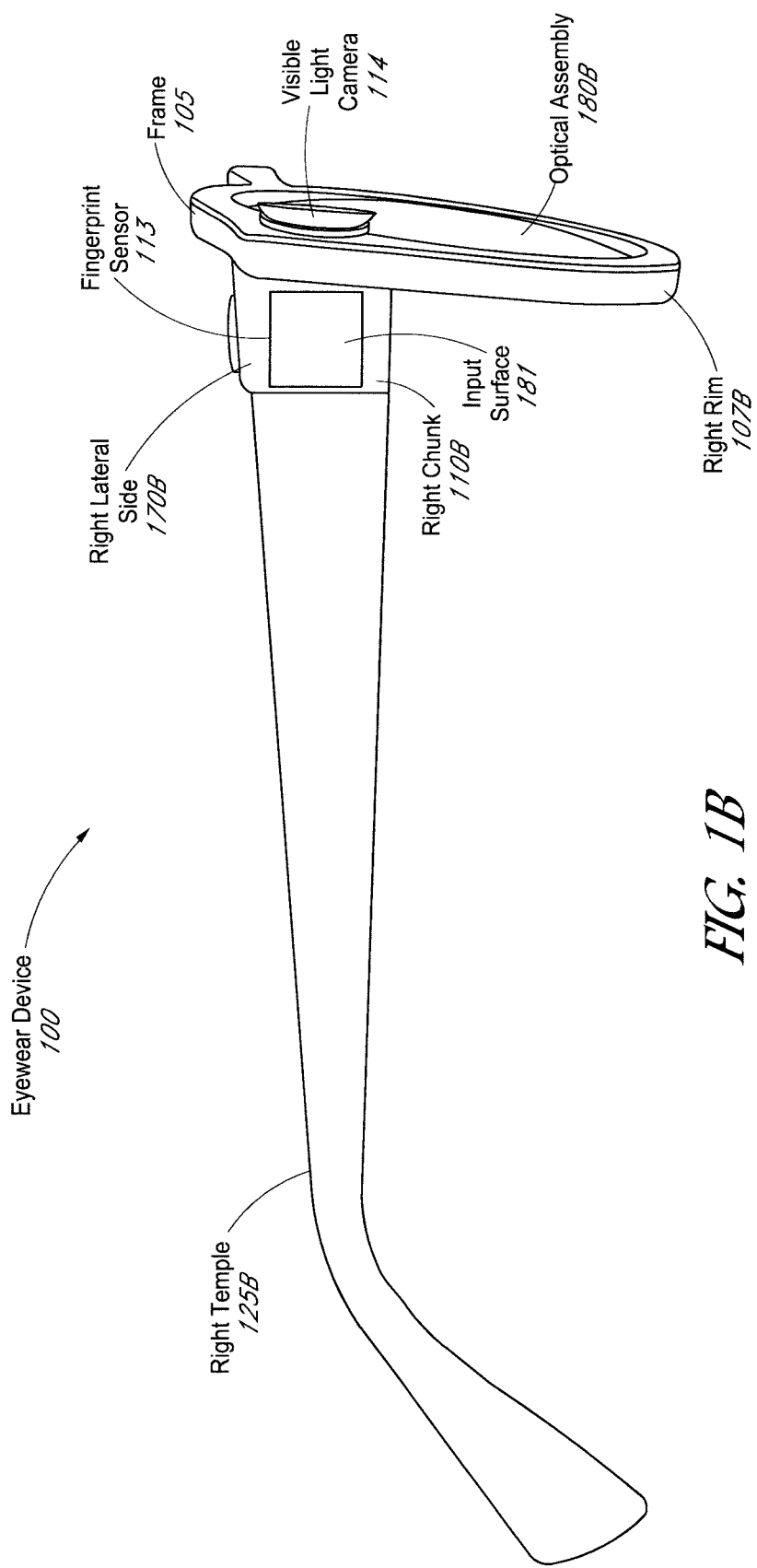
FIG. 1B is another side view of another example hardware configuration of an eyewear device, which includes a fingerprint sensor on a chunk, for use in authorizing the user to utilize the eyewear device based on extracted fingerprint features.
Figure 1C:
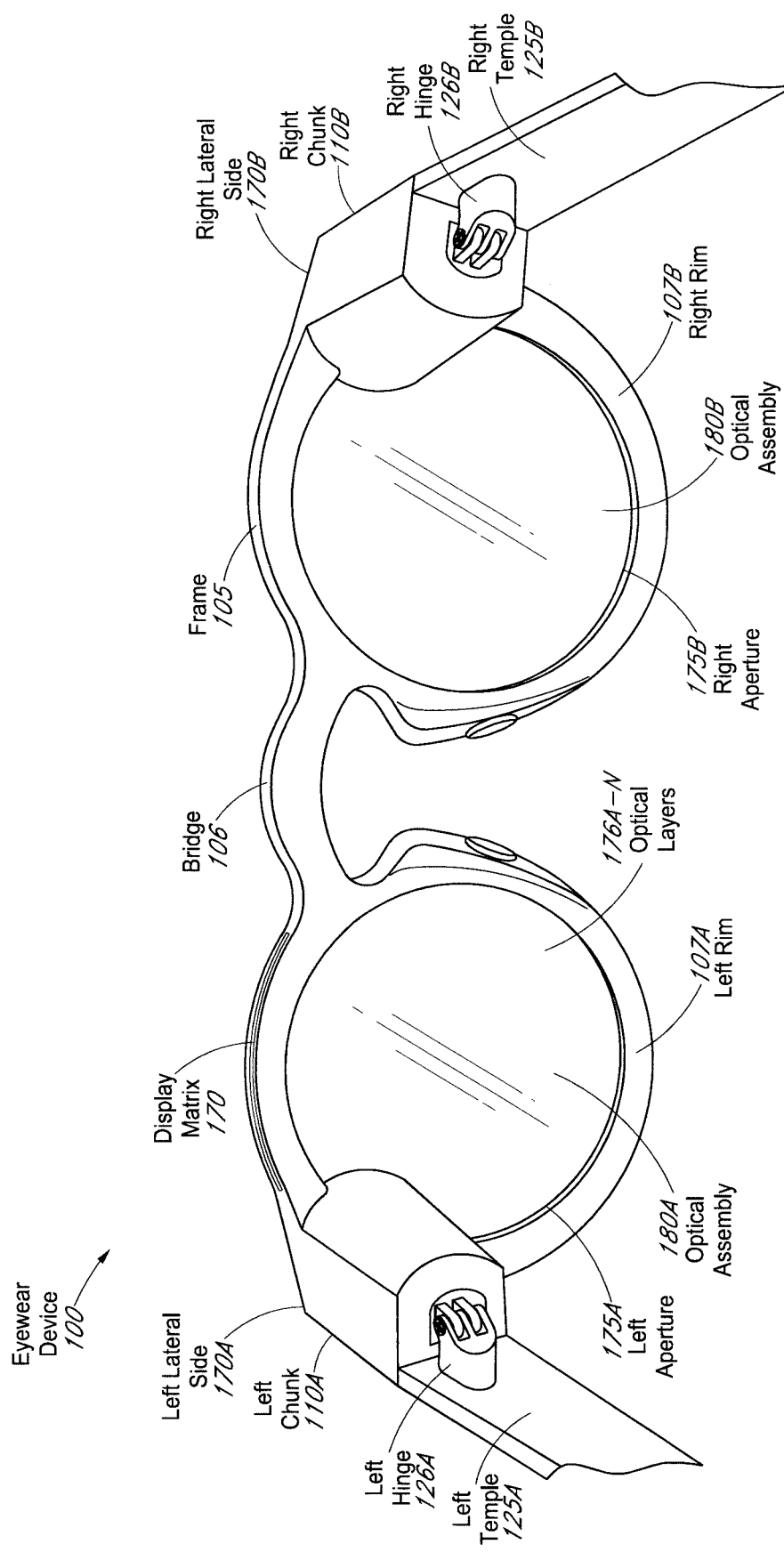
FIGS. 1C and 1D are rear views of example hardware configurations of the eyewear devices of FIGS. 1A and 1B, including two different types of image displays.

As shown in FIGS. 1A-D, the eyewear device 100 is in a form for wearing by a user, which are eyeglasses in the example of FIGS. 1A-C. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical assembly 180A-B. Optical assembly 180A-B can include various optical layers 176A-N and an image display device. The left and right temples 125A-B are connected to respective lateral sides of the frame 105, for example, via respective left and right chunks 110A-B. A substrate or materials forming the temple 125A-B can include plastic, acetate, metal, or a combination thereof. The chunks 110A-B can be integrated into or connected to the frame 105 on the lateral side Eyewear device 100 includes the fingerprint sensor 113 on the frame 105, the temple 125A-B, or the chunk 110A-B. The fingerprint sensor 113 is an analog to digital device that reads a human fingerprint and has a sensing circuit to output a dataset, which can be used to generate a two-dimensional or three-dimensional image. The fingerprint sensor 113 can include a variety of scanners or sensor arrays including passive capacitance, optical, ultrasonic, thermal, piezoresistive, radio frequency (RF) for active capacitance measurement, microelectrical mechanical systems (MEMS), or a combination thereof. The fingerprint sensor 113 includes an input surface 181, which is a touch surface to receive input of a finger skin surface from a finger contact by a finger of a user. Fingerprint sensor 113 can include a sensor array (e.g., capacitive array, piezoelectric transducer, ultrasonic transducers, etc.) which forms a two-dimensional rectangular coordinate system for tracking X and Y axes location coordinates of the patterns of fingerprint ridges of the finger skin surface on the input surface 181. In an ultrasonic transducer array example, a three-dimensional location coordinate system can be established which further includes depth measurements along a Z axis. Optical scanners may include a sensor array in the form of an image sensor array for measurement of reflected light and ultrasonic scanners may include a sensor array in the form of an ultrasonic transducer array for measurement of ultrasonic waves for tracking fingerprint ridges.

Although not shown in FIGS. 1A-D, the eyewear device 100 also includes a sensing circuit integrated into or connected to the fingerprint sensor 113. The sensing circuit is configured to track patterns of fingerprint ridges of the finger skin surface on the input surface 181. The system, which includes the eyewear device 100, has a processor coupled to the eyewear device 100 and connected to the sensing circuit; and a memory accessible to the processor. The processor and memory may be, for example, in the eyewear device 100 itself or another part of the system.

Execution of the programming by the processor configures the system (e.g., eyewear device 100, other components shown in FIG. 8, or a combination thereof), to perform functions, including functions to receive, via the input surface 181 of the fingerprint sensor 113, the patterns of fingerprint ridges of the finger skin surface on the input surface 181. The execution of the programming by the processor further configures the system to track, via the sensing circuit, the patterns of fingerprint ridges of the finger skin surface on the input surface 181. The execution of the programming by the processor further configures the system to generate a fingerprint image having the tracked patterns of fingerprint ridges. The execution of the programming by the processor further configures the system to extract fingerprint features from the fingerprint image. The execution of the programming by the processor further configures the system authorize the user to utilize the eyewear device 100 based on the extracted fingerprint features.

Fingerprint sensor 113 may be coupled to an image processor (element 812 of FIG. 8) for digital processing along with a timestamp in which a fingerprint image have tracked patterns of fingerprint ridges was generated. The timestamp can be added by the sensing circuit, which controls operation of the fingerprint sensor 113 and takes measurements from the fingerprint sensor 113. A coupled processor uses algorithms to detect and extract patterns of fingerprint features of the finger skin surface on the input surface 181, such as ridges or valleys of the fingerprint, from the digitized fingerprint images that are generated by the image processor. For example, light and dark areas of the generated fingerprint image are analyzed, which can be further based on a time that each fingerprint image is generated.

Figures 4A, 4B:
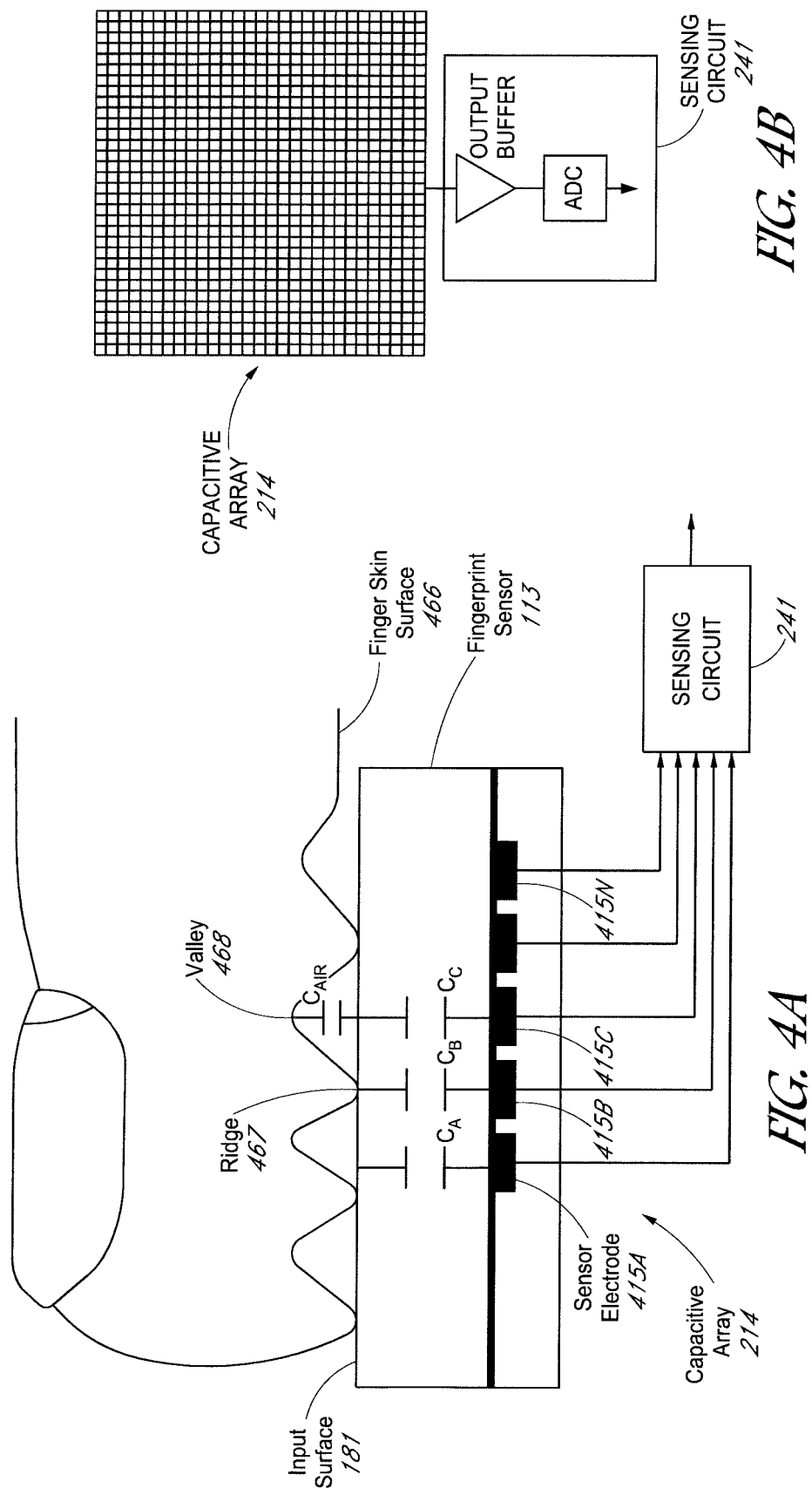
FIGS. 4A and 4B show operation and a circuit diagram of the capacitive type fingerprint sensor of FIGS. 1A-D, 2D and 3D to receive the finger skin surface inputted from the user and the sensing circuit to track the patterns of fingerprint ridges of the finger skin surface.

In a first example as shown in FIGS. 4A-B, the fingerprint sensor 113 can include a capacitive array that can include a grid of capacitors forming a parallel-plate capacitor. Sensor electrodes of the capacitive array form one plate and the dernial layer, which is electrically conductive, acts as the other layer with the dermal layer behaving as a dielectric. Ridges formed on the finger skin surface of the user are closer to the input surface 181 of the fingerprint sensor 113 and result in more electrical charge flowing away from the capacitor proximate where the ridge is located. On the other hand, valleys formed on the finger skin surface are farther from the input surface 181 of the fingerprint sensor 113 and result in less electrical charge flowing away from the capacitor proximate where the valley is located. Hence, each of the capacitors of the capacitive array behave as controllable pixels with varying electrical flow that can be mapped to a gray-level intensity to form and generate a fingerprint image.

Figure 5:
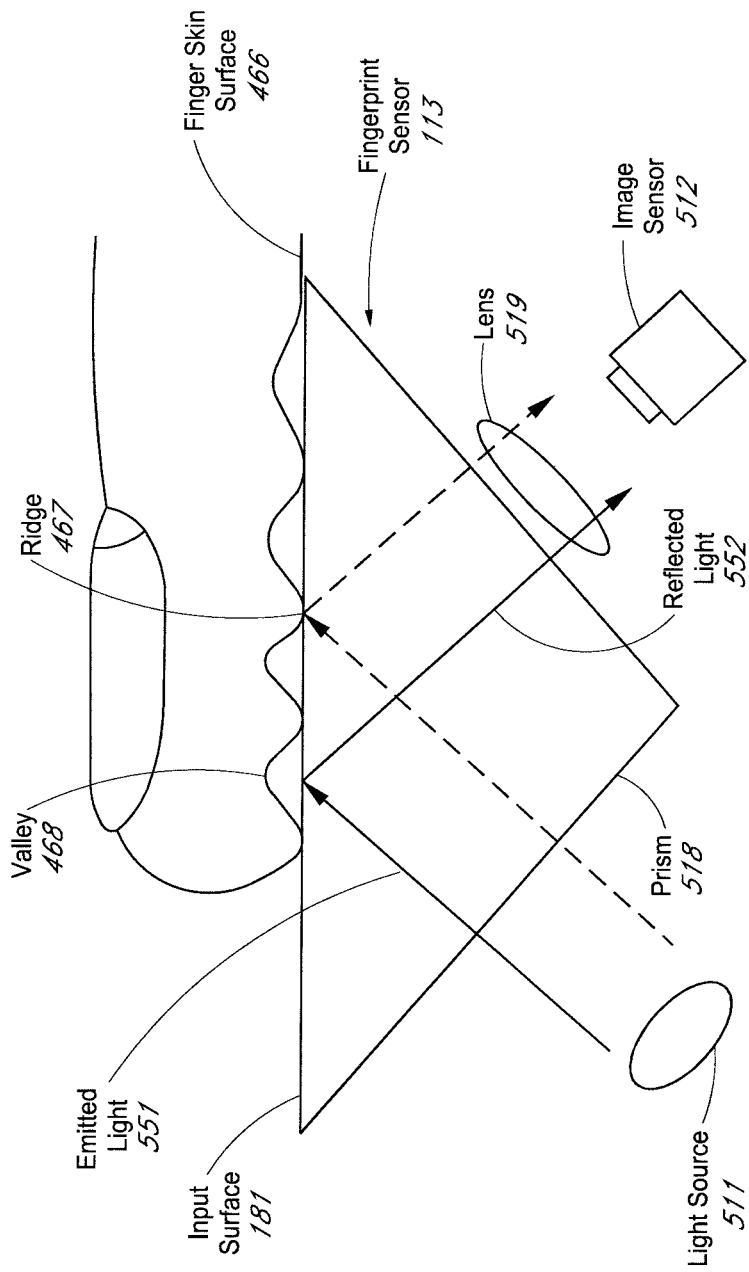
FIG. 5 shows operation of an optical scanner type fingerprint sensor of the eyewear device of FIGS. 1A-D depicting an optical scanner fingerprint sensor example.
Figure 6:
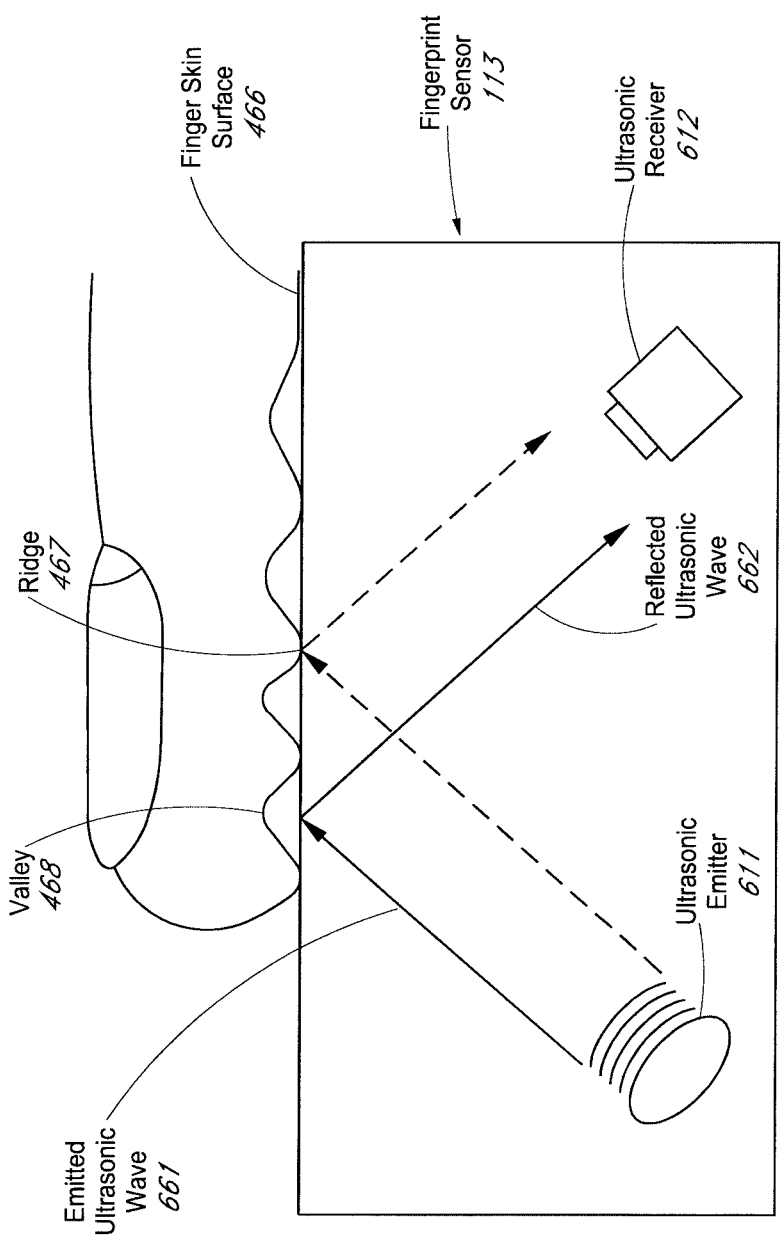
FIG. 6 shows operation of an ultrasonic scanner type fingerprint sensor of the eyewear device of FIGS. 1A-D depicting an ultrasonic scanner fingerprint sensor example.

In a second example as shown in FIG. 5, the fingerprint sensor 113 is an optical scanner type fingerprint sensor. In this optical scanner example, a light source emits light on the finger skin surface to reveal the ridges and valleys of the fingerprint and the reflected light is then read by an image sensor. In a third example as shown in FIG. 6, the fingerprint sensor 113 can be an ultrasonic scanner type fingerprint sensor. In this ultrasonic scanner example, an ultrasonic emitter emits ultrasonic waves on the finger skin surface to reveal ridges, valleys, and skin pores of the fingerprint and the reflected ultrasonic waves are then read by an ultrasonic receiver. In other examples, the fingerprint sensor 113 can include a thermal fingerprint sensor which measures temperature variations based on the principle that ridges generate more heat than valleys, resulting in a larger signal. Alternatively or additionally the fingerprint sensor 113 can include pressure fingerprint scanner (e.g., MEMS, piezoelectric) to capture differences in pressure between the ridges and valleys. Or in some examples, the fingerprint sensor 113 can include a radio frequency (RF) sensor that includes miniature antennas for each pixel of the sensor array.

Output of the fingerprint sensor 113 and the sensing circuit (not shown) is a fingerprint image, which can be a two-dimensional grayscale image of a fingerprint. The fingerprint image is stored locally, for example, in a secure area of the eyewear device 100 or other system component, such as a mobile device paired with the eyewear device 100. For example, the fingerprint image can be kept from the operating system or third party applications that are not developed by the manufacturer of the eyewear device 100. For security reasons, the fingerprint image can be analyzed and transformed into a unique histogram, checksum, or another unique pattern of extracted fingerprint features for use by the user identification application. When the extracted fingerprint features are transformed into a unique histogram or checksum, even if hackers somehow intercept or breach the extracted fingerprint features, reverse engineering of the original fingerprint image is very difficult or impossible. The user identification application matches the extracted fingerprint features with a database of captured fingerprint templates of multiple users to provide a more convenient and reliable security mechanism than a conventional user inputted password, for example. In a less secure implementation, the captured fingerprint templates in the database of captured fingerprint templates are raw fingerprint images and authorization is implemented by comparing the generated fingerprint image to the raw fingerprint images in the database to identify a match.

Eyewear device 100 may include wireless network transceivers, for example cellular or local area network transceivers (e.g., WiFi or Bluetooth™), and run sophisticated applications in response to authenticating the user. Some of the applications may include a chat application to post or send images and videos captured by a visible light to camera 114, a web browser to navigate the Internet, an application to place phone calls, video or image codecs to watch videos or interact with pictures, codecs to listen to music, a turn-by-turn navigation application (e.g., to enter in a destination address and view maps), an augmented reality application, an email application (e.g., to read and compose emails), and a banking application to perform banking transactions (e.g., transfer money to and from bank accounts or obtain the balance of his/her bank accounts). Gestures inputted on the fingerprint sensor 113 can also be used to manipulate and interact with the displayed content on the image display and control the applications.

The type of fingerprint sensor 113 depends on the intended application. The resolution of the fingerprint sensor 113 typically relates to the degree of security, where a high resolution is potentially more secure than a low resolution, but costs more to implement. In some examples, ultrasonic type fingerprint sensors 113 may be utilized where depth information (three-dimensional coordinates) for highly secure environments is needed and cost is not a major issue, for example, in banking applications.

In the example of FIG. 1A, the eyewear device includes at least one visible light camera 114 that is sensitive to the visible light range wavelength. As shown in the example, the visible light camera 114 has a frontward facing field of view. Examples of such a visible light camera 114 include a high resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light camera 114 is captured along with geolocation data, digitized by an image processor, stored in a memory, and displayed on the image display device of optical assembly 180A-B. In some examples, the fingerprint sensor 113 is responsive to provide image or video capture via the visible light camera 114, for example, in response to authenticating the user.

Figure 1D:
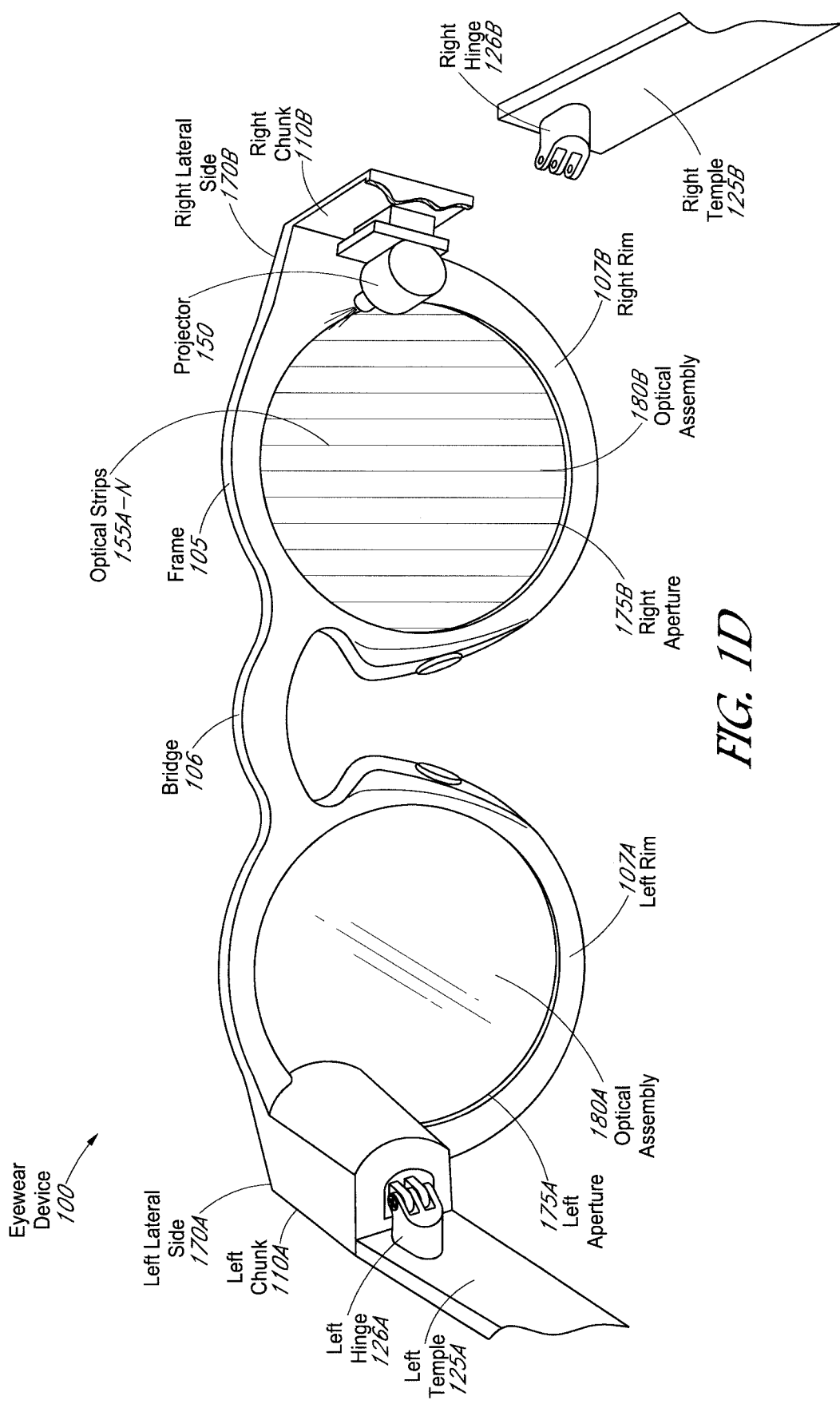

FIGS. 1C-D are rear views of example hardware configurations of the eyewear device 100 of FIG. 1A, including two different types of image displays. In one example, the image display of optical assembly 180A-B includes an integrated image display. An example of such an integrated image display is disclosed in FIG. 5 of U.S. Pat. No. 9,678,338, filed Jun. 19, 2015, titled "Systems and Methods for Reducing Boot Time and Power Consumption in Wearable Display Systems," which is incorporated by reference herein. As shown in FIG. 1C, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex so as to direct the light towards the center of the eye. The prism can optionally be sized and shaped so as to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1D. An example of a projection image display is disclosed in FIG. 6 of U.S. Pat. No. 9,678,338, filed Jun. 19, 2015, titled "Systems and Methods for Reducing Boot Time and Power Consumption in Wearable Display Systems," which is incorporated by reference herein. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, it is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1C-D, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

Utilization of the fingerprint sensor 113 in the lens of the eyewear device 100 can interfere with the line of sight of the user of the eyewear device 100 and hinder the user's view. For example, finger touches can smudge the optical assembly 180-B (e.g., optical layers, image display, and lens) and cloud or obstruct the user's vision. To avoid creating blurriness and poor clarity when the user's eyes look through the transparent portion of the optical assembly 180A-B, the fingerprint sensor 113 is located on the right temple 125B in FIG. 1A and the right chunk 110B in FIG. 1B.

FIG. 2A shows a side view of a temple of the eyewear device 100 of FIGS. 1A-D depicting a capacitive type fingerprint sensor 113 example. As shown, the right temple 125B includes the fingerprint sensor 113 and the fingerprint sensor 113 has an input surface 181. A protruding ridge 281 surrounds the input surface 181 of the fingerprint sensor 113 to indicate to the user an outside boundary of the input surface 181 of the fingerprint sensor 113. The protruding ridge 281 orients the user by indicating to the user that their finger is on top of the fingerprint sensor 113 and is in the correct position to manipulate the fingerprint sensor 113.

FIG. 2B illustrates an external side view of a portion of the temple of the eyewear device 100 of FIGS. 1A-D and 2A. In the capacitive type fingerprint sensor 113 example of FIGS. 2A-D and other fingerprint sensor examples, plastic or acetate can form the right temple 125B. The right temple 125B is connected to the right chunk 110B via the right hinge 126B.

FIG. 2C illustrates an internal side view of the components of the portion of temple of the eyewear device 100 of FIGS. 1A-D and 2B with a cross-sectional view of a circuit board 240 with the fingerprint sensor 113, a sensing circuit 241, an image display driver 242, and a processor 243. Although the circuit board 240 is a flexible printed circuit board (PCB), it should be understood that the circuit board 240 can be rigid in some examples. In some examples, the frame 105 or the chunk 110A-B can include the circuit board 240 that includes the fingerprint sensor 113. In one example, sensing circuit 241 includes a dedicated microprocessor integrated circuit (IC) customized for processing sensor data from the fingerprint sensor 113, along with volatile memory used by the microprocessor to operate. In some examples, the sensing circuit 241 and processor 243 may not be separate components, for example, functions and circuitry implemented in the sensing circuit 241 can be incorporated or integrated into the processor 243 itself.

Image display driver 242 commands and controls the image display of the optical assembly 180A-B. Image display driver 242 may deliver image data directly to the image display of the optical assembly 180A-B for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The fingerprint sensor 113, including the capacitive array 214, is disposed on the flexible printed circuit board 240. The fingerprint sensor 113 can includes a capacitive array 214 that is positioned on the input surface 181 to receive at least one finger contact inputted from a user. The sensing circuit 241 is integrated into or connected to the fingerprint sensor 113 and connected to the processor 243. The sensing circuit 241 measures voltage to track the patterns of the fingerprint ridges of the finger skin surface on the input surface 181.

FIG. 2D depicts a capacitive array pattern formed on the circuit board of FIG. 2C to receive a finger skin surface inputted from the user. The pattern of the capacitive array 214 of the fingerprint sensor 113 includes patterned conductive traces formed of at least one metal, indium tin oxide, or a combination thereof on the flexible printed circuit board 240. In the example, the conductive traces are rectangular shaped copper pads.

FIG. 3A shows an external side view of a temple of the eyewear device 100 of FIGS. 1A-D depicting another capacitive type fingerprint sensor 113. Similar to the example of FIGS. 2A-D, the right temple 125B includes the fingerprint sensor 113 and the fingerprint sensor 113 has a protruding ridge 281 that surrounds an input surface 181. FIG. 3B illustrates an external side view of a portion of the temple 125B of the eyewear device 100 of FIGS. 1A-D and 3A. Metal may form the right temple 125B and a plastic external layer can cover the metal layer.

FIG. 3C illustrates an internal side view of the components of the portion of temple of the eyewear device of FIGS. 1A-D and 3B with a cross-sectional view of a circuit board 240 with the fingerprint sensor 113, a sensing circuit 241, an image display driver 242, and a processor 243. Similar to FIG. 2C, the fingerprint sensor 113 is disposed on the flexible printed circuit board 240. Various electrical interconnect(s) 294 are formed to convey electrical signals from the input surface 181 to the flexible printed circuit board 240. FIG. 3D depicts the capacitive array pattern formed on the circuit board 240 of FIG. 3C to receive the finger skin surface inputted from the user.

FIGS. 4A-B show operation and a circuit diagram of the capacitive type fingerprint sensor 113 of FIGS. 1A-D, 2D and 3D to receive the finger skin surface inputted from the user and the sensing circuit 241 to track the patterns of fingerprint ridges of the finger skin surface 466. As shown, the patterns of fingerprint ridges includes multiple ridges 467 and valleys 468. Human skin is conductive and provides capacitive coupling in combination with an individual capacitive element of the capacitive array 214. Physical ridges 467 of the finger skin surface 466 are closer to the capacitor plates and have a higher capacitance whereas the valleys 468 of the finger skin surface 466 (e.g., the subdermal layer), have a lower capacitance. The fingerprint sensor 113 tracks the location coordinates of the patterns of fingerprint ridges on a grid that forms a two-dimensional rectangular coordinate system to track X and Y axes of the patterns of fingerprint ridges on the fingerprint sensor 113.

The view of FIG. 4A is intended to give a cross-sectional view of three capacitors of the capacitive array 214 of the fingerprint sensor 113 of FIGS. 2A-D and 3A-D, and the coupled sensing circuit 241. As shown, the fingerprint sensor 113 includes the capacitive array 214 formed by capacitors, including capacitors $C_A$, $C_B$, and $C_C$. The capacitive array 214 includes multiple patterned conductive sensor electrodes 415A-N, and it should be understood that although only five sensor electrodes are shown, the number can be 20, 100, 1000, etc. or essentially any number depending on the application. In one example, the capacitive array 214 includes 100 sensor electrodes, in other examples, the 100 sensor electrodes are arranged in a 10×10 grid. The sensor electrodes 415A-N are connected to the flexible printed circuit board 240 and disposed below the input surface 181. At least one respective electrical interconnect connects the sensing circuit 241 to the sensor electrodes 415A-N. The sensing circuit 241 measures capacitance changes of each of the sensor electrodes 415A-N of the capacitive array 214 to track the patterns of fingerprint ridges of the finger skin surface on the input surface 181. In the example, the sensor electrodes 415A-N are rectangular patterned conductive traces formed of at least one of metal, indium tin oxide, or a combination thereof.

Since the capacitors $C_A$, $C_B$, and $C_C$ of the capacitive array 214 store electrical charge, connecting them to conductive plates on the input surface 181 allows the capacitors to track the fingerprint friction details of the finger skin surface. For example, capacitor $C_B$ tracks ridge 467 and capacitor $C_C$ tracks valley 468. Ridge 467 causes a higher capacitance than valley 468, generating a higher measured voltage signal. Hence, charge stored in the capacitor $C_B$ changes slightly (e.g., the charge becomes higher) when the ridge 467 of finger skin surface 466 is placed over the conductive plates of capacitor $C_B$, while an air gap between the valley 468 of finger skin surface 466 will leave the charge at the capacitor $C_C$ relatively unchanged (e.g., the charge remains lower). As shown in FIG. 4B, the sensing circuit 241 can include an op-amp integrator circuit which can track these changes in capacitance of capacitive array 214, and the capacitance changes can then be recorded by an analog-to-digital converter (ADC) and stored in a memory along with timing data of when the capacitance change is sensed.

FIG. 5 shows operation of an optical scanner type fingerprint sensor 113 of the eyewear device 100 of FIGS. 1A-D depicting an optical scanner fingerprint sensor 113 example. As shown, the fingerprint sensor 113 includes an optical scanner that includes a light source 511 to emit light to illuminate the finger skin surface 466, shown as emitted light 551. The optical scanner further includes an image sensor 512 to capture an image of reflection variations of the emitted light, shown as reflected light 551, on the fingerprint ridges (e.g., ridge 467 and valley 468) of the finger skin surface 466. The light source 511 and the image sensor 512 are connected to the frame 105, the temple 125A-B, or the chunk 110A-B. The optical scanner fingerprint sensor 113 captures a digital image of the fingerprint using visible light although other light wavelengths can be used, including infrared or near-infrared.

The scanning process may initiate when the finger skin surface 466 is placed on the fingerprint sensor 113. Execution of the programming by the processor 243 of the eyewear device 100 configures the eyewear device 100 to perform functions, including functions to emit, via the light source 511, the light 551 to illuminate the finger skin surface 466. In one example, the light source 511 can include an array of light emitting diodes (LEDs), for example, with a light-emitting phosphor layer, which illuminates the pattern of fingerprint ridges of the finger skin surface 466 with emitted light 551. Although a single emitted light wave 551 is shown in FIG. 5, many such emitted light waves are emitted by each of the point light source 511 elements (e.g., electrical to optical transducers) that collectively form an array of emitters of light sources 511, for example, at different time intervals.

Reflected light 552 from the finger skin surface 466 passes back through the phosphor layer to an array of solid state pixels of the image sensor 512. Although a single reflected light wave 552 is shown in FIG. 5, many such reflected light waves are received by each of the receiver elements (e.g., optical to electrical transducers) in the image sensor array of image sensor 512, for example, at different time intervals. Hence, execution of the programming by the processor 243 of the eyewear device 100 configures the eyewear device 100 to perform functions, including functions to capture, via the image sensor 512, the image of reflection variations of the emitted light 552 on the fingerprint ridges of the finger skin surface 466. In an example, the image sensor 512 may include a CMOS or complimentary charge-coupled device (CCD) based optical imager to capture an image of the finger skin surface 466. A CCD is an array of light-sensitive diodes called photo sites, which generate an electrical signal in response to light photons, sometimes referred as optical-to-electrical transducers. Each photosite records a pixel, a tiny dot representing the light that hit that spot. Such CCD devices are quite sensitive to low light levels can produce grayscale images. Collectively, the light and dark pixels form an image of the fingerprint of the finger skin surface 466. An inverted image of the finger skin surface 466 may be generated where the darker areas represent more reflected light and the lighter areas represent less reflected light. Darker areas are actually ridges 467 of the finger and the lighter areas are the valleys 468 between the ridges. An analog-to-digital converter in the sensing circuit 241 can be utilized which processes the electrical signal to generate the digital representation of the fingerprint image.

FIG. 6 shows operation of an ultrasonic scanner-type fingerprint sensor 113 of the eyewear device 100 of FIGS. 1A-D depicting an ultrasonic scanner fingerprint sensor example 113. As shown, the fingerprint sensor 113 includes an ultrasonic scanner, which has an ultrasonic emitter 611 to emit ultrasonic waves to strike the finger skin surface 466, shown as emitted ultrasonic wave 661 and an ultrasonic wave generator (not shown). Ultrasonic emitter 611 may include a piezoelectric transducer array, which is coupled to the ultrasonic wave generator, to transform an electrical signal into an ultrasonic wave to create the desired waveform pulses of the ultrasonic wave 661 at proper time intervals. The ultrasonic scanner further includes an ultrasonic receiver 612 to capture reflection variations of the emitted ultrasonic waves, shown as reflected ultrasonic wave 662, on the fingerprint ridges (e.g., ridge 467 and valley 468) of the finger skin surface 466. Ultrasonic emitter 611 and ultrasonic receiver 612 are connected to the frame 105, the temple 125A-B, or the chunk 110A-B of the eyewear device 100.

Ultrasonic receiver 612 may include an ultrasonic transducer array to detect the direction and strength of reflected ultrasonic waves 662 and transform those measurements into an electrical signal. The ultrasonic scanner fingerprint sensor 113 captures a digital image of the fingerprint using ultrasonic wave pulses. In one example, an ultrasonic emitter 611 that is a piezoelectric micromachined ultrasonic transducer (PMUT) array that is bonded at wafer-level to an ultrasonic receiver 612 that includes CMOS signal processing electronics forms the ultrasonic scanner fingerprint sensor 113.

Execution of programming by the processor 243 of the eyewear device 100 configures the eyewear device 100 to perform functions, including functions to emit, via the ultrasonic emitter 611, the ultrasonic waves 661 to strike the finger skin surface 466. In one example, the ultrasonic emitter 611 transmits an ultrasonic wave 661 against the finger skin surface 466 that is placed over the input surface 181. For example, a piezoelectric transducer array of ultrasonic emitter 611, which includes multiple point sources of the ultrasound energy, send the emitted ultrasonic waves 661 through an ultrasound transmitting media, including input surface 181. Some of the ultrasonic waves 662 are absorbed and other parts bounce back to the ultrasonic receiver 612.

Emitted ultrasonic waves 661 may be continuous or started and stopped to produce pulses. Although FIG. 6 shows a single emitted ultrasonic wave 661, each of the point source elements (e.g., piezoelectric transducer of ultrasound energy) in the ultrasonic emitter array of ultrasonic emitter 611 emit many such ultrasonic waves, for example, at different time intervals. At each pattern of fingerprint ridges encountered by the ultrasonic wave 661 pulses, a portion of the pulse reflects. For example, the ridge 467 and valley 468 may each reflect a portion of ultrasonic pulses. The fraction of ultrasound reflected is a function of differences in impedance between the two materials comprising the interface (e.g., input surface 181 and ridge 467 or input surface 181 and valley 468). The fraction of ultrasound reflected can be calculated based on the acoustic impedances of the two materials, where acoustic impedance is a measure of a material's resistance to the propagation of ultrasound.

Execution of the programming by the processor 243 of the eyewear device 100 further configures the eyewear device 100 to perform functions, including functions to capture, via the ultrasonic receiver 612, the reflection variations of the emitted ultrasonic waves 662 on the fingerprint ridges of the finger skin surface 466. Variations of the reflected ultrasonic wave 662 is unique to the finger skin surface 466 including the ridges 467, valleys 468, and pores (not shown). Ultrasonic receiver 612 includes a sensor array that detects mechanical stress to calculate the intensity of the returning reflected ultrasonic wave 662 at different points on the finger skin surface 466 on the input surface 181. Multiple scans of the finger skin surface 466 can allow for depth data to be captured resulting in a highly detailed three-dimensional map reproduction of the finger skin surface 466, e.g., with X, Y, and Z location coordinates. The ultrasonic sensor can operate through metal, glass, and other solid surfaces which form the eyewear device 100.

The ultrasonic receiver 612 detects reflected ultrasonic wave 662. In particular, elapsed time during which the ultrasonic pulses travel from the ultrasound emitter 611 to the interface (e.g., ridge 467 and valley 468) and back may be determined. Although FIG. 6 shows a single reflected ultrasonic wave 662, each of the receiver elements (e.g., ultrasonic transducers of ultrasound energy) in the ultrasonic receiver sensor array of ultrasonic receiver 612 receive many such ultrasonic waves, for example, at different time intervals. The elapsed time may be used to determine the distances traveled by the emitted ultrasonic wave 661 and its reflected ultrasonic wave 662 pulse. By knowing the travel distance, the position and pattern of fingerprint ridges may be determined based on reflected wave pulses associated with the finger skin surface 466. Reflected wave 662 pulses associated with the finger skin surface 466 are converted from analog to a digital value representing the signal strength and then combined in a gray-scale bitmap fingerprint image. This generates a contour fingerprint image map with various location coordinates of patterns of fingerprint ridges of the finger skin surface 466. The generated image map can include a third dimension (Z axis) representative of the depth of the pattern of fingerprint ridges.

FIGS. 7A-D show operation of the system that includes the eyewear device 100 with the fingerprint sensor examples of FIGS. 1A-D, 4A-B, 5, and 6. Execution of programming in a memory by the processor 243 of the eyewear device 100 configures the eyewear device 100 to perform functions, including the functions discussed in FIGS. 7A-D below. Although the functions described in FIGS. 7A-D are described as implemented by the processor 243 of the eyewear device 100, other components of the system 800 of FIG. 8 can implement any of the functions described herein, for example the mobile device 890, server system 898, or other host computer of the system 800

Beginning in FIG. 7A, the eyewear device 100 receives, on the input surface 181 of the fingerprint sensor 113, the finger skin surface 466 of the user. As previously described, the finger skin surface 466 includes multiple ridges 467 and valleys 468 uniquely identifying a user. The sensing circuit 241 determines a respective location coordinate of the fingerprint ridges of the finger skin surface 466 from at least one finger contact by a finger of a user and a respective input time of the at least one finger contact on the input surface 181.

Continuing to FIG. 7B, the eyewear device 100 tracks, via the sensing circuit 241, the patterns of fingerprint ridges 778 of the finger skin surface 466 on the input surface 181. The fingerprint sensor 113 tracks the location coordinates of the patterns of fingerprint ridges 778 on a grid that forms a two-dimensional rectangular coordinate system to track X and Y axes of the patterns of fingerprint ridges on the fingerprint sensor 113.

In one example, the fingerprint sensor 113 is configured to receive multiple finger contacts by different portions of the finger of the user. Each of the different portions of the finger of the user correspond to a different finger skin surface 466 inputted at a different input time. The sensing circuit 241 tracks the patterns of fingerprint ridges 778 of each of the multiple finger contacts, including location coordinates of the patterns of fingerprint ridges 778 of each different finger skin surface 466 received at the different input times. The function to receive on the input surface 181 of the fingerprint sensor 113 the finger skin surface 466 inputted from the user includes to receive the multiple finger contacts by different portions of the finger of the user. The function to track, via the sensing circuit 241, the patterns of fingerprint ridges 778 of finger skin surface 466 on the input surface 181 includes to track the patterns of fingerprint ridges 778 of each of the multiple finger contacts, including the location coordinates of the patterns of fingerprint ridges 778 of each different finger skin surface 466 inputted at the different input time.

Moving to FIG. 7C, the eyewear device 100 generates a fingerprint image 779 having the tracked patterns of fingerprint ridges 778. Pre-processing can help enhance the quality of the fingerprint image 779 by filtering and removing noise. For example, ridges can be enhanced by applying a region mask estimation and filtering algorithm, local orientation estimation, or local frequency estimation. In another example, the fingerprint image 779 is enhanced by creating a Gabor enhanced image and applying a wavelet transform to help extract pore type fingerprint features. The function to generate the fingerprint image having the tracked patterns of fingerprint ridges 778 can include additional functions. The additional functions can include to generate multiple fingerprint images to create a larger view of the finger of the user. Each of the multiple fingerprint images can correspond to the tracked patterns of fingerprint ridges 778 on each different finger skin surface 466 inputted at the different input time. The additional functions can include to combine the tracked patterns of fingerprint ridges 778 of each different finger skin surface 466 inputted at the different input time from the multiple fingerprint images into an aggregate fingerprint image with the larger view of the finger of the user. In this case, the function to extract the fingerprint features described in FIG. 7D extracts the fingerprint features 792 from the aggregate fingerprint image.

Proceeding to FIG. 7D, the eyewear device 100 extracts fingerprint features 792 from the fingerprint image 779. Extracted fingerprint features 792 include fingerprint friction ridge details, which may include the orientation field of the ridges (e.g., level 1), minutiae points (e.g., level 2), and pores and ridge contours (e.g., level 3). FIG. 7D shows several different types of extracted fingerprint features 792, including an incipient ridge 793, an island ridge 794, an end of a ridge 794, a short ridge 796, a pore inside a ridge 797, a ridge enclosure 798, and a ridge fork 799. Incipient ridge 793 is an immature ridge between papillary lines, thinner and shorter than the papillary lines, and does not bifurcate. Ridge contours of extracted fingerprint features 792 can be described as straight, convex, peak, table, pocket, concave, or by an angle. The pore 797 may be perpetual, immutable, and unique and can have various shapes, including round, elliptical, oval square, rhomboid, or triangular.

Figure 8:
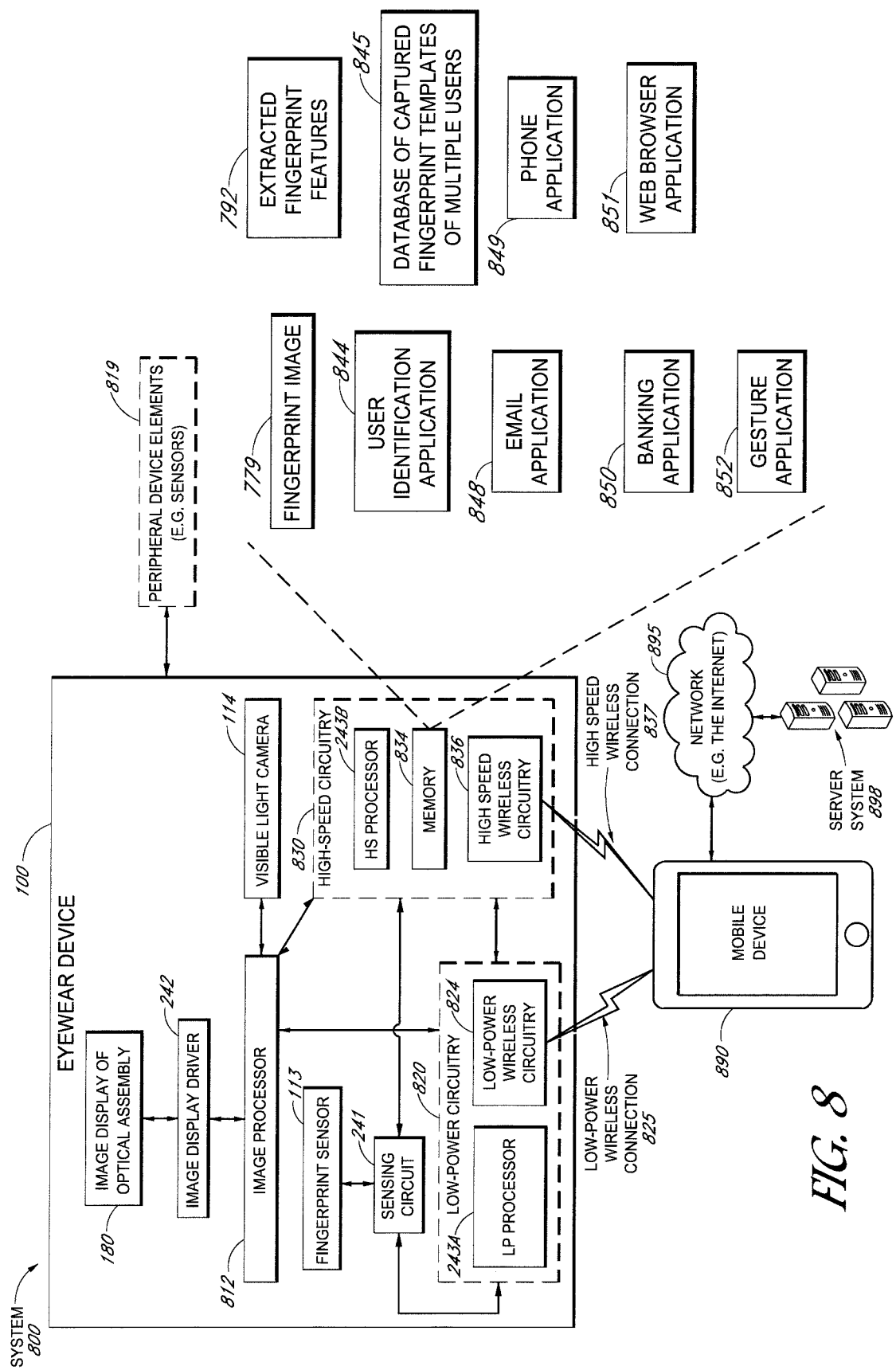
FIG. 8 is a high-level functional block diagram of an example fingerprint sensor system including the eyewear device, a mobile device, and a server system connected via various networks.

FIG. 8 is a high-level functional block diagram of an example fingerprint sensor system. The system 800 includes eyewear device 100, mobile device 890, and server system 898. Mobile device 890 may be a smartphone, tablet, laptop computer, access point, or any other such device capable of connecting with eyewear device 100 using both a low-power wireless connection 825 and a high-speed wireless connection 837. Mobile device 890 is connected to server system 898 and network 895. The network 895 may include any combination of wired and wireless connections.

Server system 898 may be one or more computing devices as part of a service or network computing system, for example, that include a processor, a memory, and network communication interface to communicate over the network 895 with the mobile device 890 and eyewear device 100. The memory of the server system 898 can include fingerprint images or extracted fingerprint features as captured by the eyewear device 100 and transmitted via the depicted networks 825, 837, 895. The memory of the server system 898 can also include a database of captured fingerprint templates of multiple users and a user identification application to perform functions of the programming described herein. Execution of the programming by the processor of the server system 898 can cause the server system 898 to perform some or all of the functions described herein, for example, to uniquely identify the user of the eyewear device 100 based on the extracted fingerprint features to authorize the user to utilize the eyewear device 100.

Mobile device 890 and elements of network 895, low-power wireless connection 825, and high-speed wireless architecture 837 may be implemented using details of the architecture of mobile device 890, for example utilizing the short range XCVRs and WWAN XCVRs of mobile device 890 described in FIG. 9.

Low-power wireless circuitry 824 and the high-speed wireless circuitry 836 of the eyewear device 100 can include short range transceivers (Bluetooth™) and wireless wide, local, or wide area network transceivers (e.g., cellular or WiFi). Mobile device 890, including the transceivers communicating via the low-power wireless connection 825 and high-speed wireless connection 837, may be implemented using details of the architecture of the eyewear device 100, as can other elements of network 895.

Output components of the eyewear device 100 include visual components, such as the image display of the optical assembly 180 as described in FIGS. 1C-D (e.g., a display such as a liquid crystal display (LCD), a plasma display panel (PDP), a light emitting diode (LED) display, or a projector). The image display of the optical assembly 180 is driven by the image display driver 242. The output components of the eyewear device 100 further include acoustic components (e.g., speakers), haptic components (e.g., a vibratory motor), other signal generators, and so forth. The input components of the eyewear device 100 include the fingerprint sensor 113, and various components of the system, including the mobile device 890 and server system 898, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

System 800 may optionally include additional peripheral device elements 819. Such peripheral device elements 819 may include biometric sensors, additional sensors, or display elements integrated with eyewear device 100. For example, peripheral device elements 1119 may include any I/O components including output components, motion components, position components, or any other such elements described herein.

For example, the biometric components of the system include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 825 and 837 from the mobile device 890 via the low-power wireless circuitry 824 or high-speed wireless circuitry 836

Eyewear device 100 includes a fingerprint sensor 113, visible light camera 114, image display of the optical assembly 180, sensing circuit 241, image display driver 242, image processor 812, low-power circuitry 820, and high-speed circuitry 830. The components shown in FIG. 8 for the eyewear device 100 are located on one or more circuit boards, for example a PCB or flexible PCB, in the temples. Alternatively or additionally, the depicted components can be located in the chunks, frames, hinges, or bridge of the eyewear device 100. Visible light camera 114 can include digital camera elements such as a complementary metal-oxide-semiconductor (CMOS) image sensor, charge coupled device, a lens, or any other respective visible or light capturing elements that may be used to capture data.

Memory 834 includes various fingerprint image(s) 779, extracted fingerprint features 792, a user identification application 844, and a database of captured fingerprint templates of multiple users 845 to perform the functions of the programming described herein, for example the user authorization operations outlined in further detail in FIGS. 1-7.

In one example, user identification application 844 includes the functions outlined above, including to receive, via the input surface 181 of the fingerprint sensor 113, the patterns of fingerprint ridges of the finger skin surface 466 on the input surface 181; and track, via the sensing circuit 241, the patterns of fingerprint ridges of the finger skin surface 466 on the input surface 181. User identification application 844 further includes functions to generate a fingerprint image 779 having the tracked patterns of fingerprint ridges; and extract fingerprint features 792 from the fingerprint image 779.

User identification application 844 further includes functions to authorize the user to utilize the eyewear device 100 based on the extracted fingerprint features 792. The function to authorize the user to utilize the eyewear device 100 based on the extracted fingerprint features 792 includes functions to: compare the extracted fingerprint features 782 against the database of captured fingerprint templates of multiple users 845 to find a matching captured fingerprint template; and authorize the user to utilize the eyewear device 100 in response to finding the matching captured fingerprint template. The function to authorize the user to utilize the eyewear device 100 based on the extracted fingerprint features 792 can further include functions to determine an identity of the user in response to finding the matching captured fingerprint template; and log the user into the eyewear device 100 to unlock the eyewear device 100 based on the determined identity of the user.

Each of the captured fingerprint templates in the database of multiple users 845 can correspond to an account of a respective registered user of the eyewear device 100. The account of the respective registered user includes at least one application access control for a respective application executed on the eyewear device 100 (e.g., applications 848-852). The at least one application access control can be configured to enable, disable, or restrict access to the respective application. The function to authorize the user to utilize the eyewear device 100 based on the extracted fingerprint features 792 includes functions to: determine the account of the user including the at least one application access control; and enable, disable, or restrict access to the respective application being executed on the eyewear device 100 based on the at least one application access control.

To establish and set up the fingerprint sensor system, the user identification application 844 further includes functions to before authorizing the user to utilize the eyewear device 100, register the identity of the user with the eyewear device 100. The register the identity of the user function includes additional functions to: acquire the fingerprint image of the user; preprocess the acquired fingerprint image to detect fingerprint features from the acquired fingerprint image; and store the detected fingerprint features in the database of captured fingerprint templates 845 as one of the captured fingerprint templates.

The function to acquire the fingerprint image of the user includes additional functions to: receive, via the input surface 181 of the fingerprint sensor 113, the finger skin surface 466 inputted from the user; track, via the sensing circuit 241, the patterns of fingerprint ridges of the finger skin surface 466 on the input surface 181; and output the acquired fingerprint image having the patterns of fingerprint ridges. The detected fingerprint features from the acquired fingerprint image are fingerprint friction ridge details. The fingerprint friction ridge details include a ridge pattern, a minutiae point, a pore shape, or a ridge shape.

Although shown as an application, it should be understood that the user identification application 844 can be part of the operating system stored in the memory 834 of the eyewear device 100 and provides an application programming interface (API) which is responsive to calls from other applications. Authorization or identification of the user can be utilized to allow the user to interact with and manipulate various applications, including the depicted email application 848, phone application 849, banking application 850, web browser application 851, as well as for example an augmented reality application, turn-by-turn navigation application, photo and video viewer application, music player application, etc. Through a series of one or more calls to the API of the user identification application 844, the various applications 848-851 can authorize or identify the user.

Image processor 812, fingerprint sensor 113, and sensing circuit 241 are structured within eyewear device 100 such that the components may be powered on and booted under the control of low-power circuitry 820. Image processor 812, fingerprint sensor 113, and sensing circuit 241 may additionally be powered down by low-power circuitry 820. Depending on various power design elements associated with image processor 812, fingerprint sensor 113, and sensing circuit 241, these components may still consume a small amount of power even when in an off state. This power will, however, be negligible compared to the power used by image processor 812, fingerprint sensor 113, and sensing circuit 241 when in an on state, and will also have a negligible impact on battery life. As described herein, device elements in an "off" state are still configured within a device such that low-power processor 243A is able to power on and power down the devices. A device that is referred to as "off" or "powered down" during operation of eyewear device 100 does not necessarily consume zero power due to leakage or other aspects of a system design.

In one example embodiment, image processor 812 comprises a microprocessor integrated circuit (IC) customized for processing sensor data from the fingerprint sensor 113, sensing circuit 241, and visible light camera 114, along with volatile memory used by the microprocessor to operate. In order to reduce the amount of time that image processor 812 takes when powering on to processing data, a non-volatile read only memory (ROM) may be integrated on the IC with instructions for operating or booting the image processor 812. This ROM may be minimized to match a minimum size needed to provide basic functionality for gathering sensor data from fingerprint sensor 113, sensing circuit 241, and visible light camera 114, such that no extra functionality that would cause delays in boot time are present. The ROM may be configured with direct memory access (DMA) to the volatile memory of the microprocessor of image processor 812. DMA allows memory-to-memory transfer of data from the ROM to system memory of the image processor 812 independent of operation of a main controller of image processor 812. Providing DMA to this boot ROM further reduces the amount of time from power on of the image processor 812 until sensor data from the fingerprint sensor 113, sensing circuit 241, and visible light camera 114 can be processed and stored. In certain embodiments, minimal processing of the camera signal from the fingerprint sensor 113, sensing circuit 241, and visible light camera 114 is performed by the image processor 812, and additional processing may be performed by applications operating on the mobile device 890 or server system 898.

Low-power circuitry 820 includes low-power processor 243A and low-power wireless circuitry 824. These elements of low-power circuitry 1120 may be implemented as separate elements or may be implemented on a single IC as part of a system on a single chip. Low-power processor 243A includes logic for managing the other elements of the eyewear device 100. As described above, for example, low power processor 243A may accept user input signals from the fingerprint sensor 113 and sensing circuit 241. Low-power processor 243A may also be configured to receive input signals or instruction communications from mobile device 890 via low-power wireless connection 825. Additional details related to such instructions are described further below. Low-power wireless circuitry 824 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 824. In other embodiments, other low power communication systems may be used.

High-speed circuitry 830 includes high-speed processor 243B, memory 834, and high-speed wireless circuitry 836. In the example, the sensing circuit 241 and fingerprint sensor 113 are shown as being coupled to the low-power circuitry 820 and operated by the low-power processor 243B. However, it should be understood that in some examples the fingerprint sensor 113 and sensing circuit 241 can be coupled to the high-speed circuitry 830 and operated by the high-speed processor 243B. In the example, the image display driver 242 is coupled to the high-speed circuitry 830 and operated by the high-speed processor 243B in order to drive the image display of the optical assembly 180.

High-speed processor 243B may be any processor capable of managing high-speed communications and operation of any general computing system needed for eyewear device 100. High speed processor 243B includes processing resources needed for managing high-speed data transfers on high-speed wireless connection 837 to a wireless local area network (WLAN) using high-speed wireless circuitry 836. In certain embodiments, the high-speed processor 243B executes an operating system such as a LINUX operating system or other such operating system of the eyewear device 100 and the operating system is stored in memory 834 for execution. In addition to any other responsibilities, the high-speed processor 243B executing a software architecture for the eyewear device 100 is used to manage data transfers with high-speed wireless circuitry 836. In certain embodiments, high-speed wireless circuitry 836 is configured to implement Institute of Electrical and Electronic Engineers (IEEE) 802.11 communication standards, also referred to herein as Wi-Fi. In other embodiments, other high-speed communications standards may be implemented by high-speed wireless circuitry 836.

Memory 834 includes any storage device capable of storing various data and applications, including, among other things, the depicted fingerprint image(s) 779, extracted fingerprint features 792, user identification application 844, database of captured fingerprint templates of multiple users 845, applications 848-852, camera data generated by the visible light camera 114 and the image processor 812, as well as images generated for display by the image display driver 242 on the image display of the optical assembly 180. While memory 834 is shown as integrated with high-speed circuitry 830, in other embodiments, memory 834 may be an independent standalone element of the eyewear device 100. In certain such embodiments, electrical routing lines may provide a connection through a chip that includes the high-speed processor 243B from the image processor 812 or low-power processor 243A to the memory 834. In other embodiments, the high-speed processor 243B may manage addressing of memory 834 such that the low-power processor 243A will boot the high-speed processor 243B any time that a read or write operation involving memory 834 is needed.

As explained in further detail herein, authorizing or uniquely identifying the user includes comparing the extracted fingerprint features 792 derived from the fingerprint image 779 of the finger skin surface of the user against the database of captured fingerprint templates of multiple users 845 via a user identification application 844. Such comparison can be done on a device separate from the eyewear device 100, such as a host computer, which includes the mobile device 890 and server system 898. Due to the private nature of data from fingerprint scans, in some examples, identification may occur on the eyewear device 100 alone and in combination with the mobile device 890. However, it should be understood that user identification can occur on essentially any host computer, which includes both the mobile device 890 and server system 898. For example, as shown, the eyewear device 100 can include the processors 243A, 243B; the memory 834, a user identification application 844 in the memory 834, to perform the functions of the programming to configure the eyewear device to receive the patterns of fingerprint ridges, track the patterns of fingerprint ridges, and generate the fingerprint image 779, as described herein. In this case, the host computer 890 and 898 coupled to the eyewear device 100 via the networks 825, 837, and 895 as shown, can include a second processor, a second memory; and the function of the programming to authorize or identify the user to utilize the eyewear device 100. Where and which components of the depicted system 800 perform the user authorization or identification, depends on the security preferences of the user and privacy requirements of the system 800 because storage of such private identification data may be subject to various rules and regulations.

To achieve better privacy, the user identification application 844 of the eyewear device 100 can extract the fingerprint features 792 into a derivative signature form, such as a unique histogram, checksum, or other derivative such that reverse engineering the actual biometric fingerprint of the user is virtually impossible. The user identification application 844 transmits the extracted fingerprint features 792 to the host computer 890 and 898 to authorize or identify the user to utilize the eyewear device 100 by comparing the extracted fingerprint features 792 against the database of captured fingerprint templates of multiple users 845 which would store the unique histogram or checksum as the fingerprint templates. Alternatively or additionally, the extracted fingerprint features 792 and database of captured fingerprint templates of multiple users 845 are stored in an encrypted form requiring keys to decrypt (e.g., public and private keys) before processing in order to deter hackers from breaching the user's sensitive biometric data.

In one example, the host computer is the mobile device 890 and the network is a wireless short-range network 825 or a wireless local area network 837. In this example, the mobile device 890 includes a storage device having the database of captured fingerprint templates of multiple users 845. The host computer includes the function to authorize the user to utilize the eyewear device 100. Hence, the mobile device 890 includes the programming functions to: compare the extracted fingerprint features 792 against the database of captured fingerprint templates of multiple users 845 to find a matching captured fingerprint template; and authorize the user to utilize the eyewear device 100 in response to finding the matching captured fingerprint template.

As noted above, eyewear device 100 may include cellular wireless network transceivers or other wireless network transceivers (e.g., WiFi or Bluetooth™), and run sophisticated applications. Some of the applications may include email application 848, phone application 849 to place phone calls, web browser application 851 to navigate the Internet, banking application 850, video or image codecs to watch videos or interact with pictures, codecs to listen to music, a turn-by-turn navigation application, an augmented or virtual reality application, etc. To facilitate navigation, touch gestures inputted on the fingerprint sensor 113 can be used to manipulate and interact with the displayed content on the image display of the optical assembly 180 and control the applications, for example, based on detected touch events as disclosed in U.S. Provisional Pat. App. No. 62/615,664, filed Jan. 10, 2018, titled "Eyewear Device with Finger Activated Touch Sensor," which is incorporated by reference herein in its entirety.

Hence, to facilitate navigation, a gesture application 852 stored in the memory 834 may control the fingerprint sensor 113 to operate as a touch sensor to manipulate and interact with the displayed content (e.g., graphical user interface) on the optical assembly 180 with image display to control applications 848-851 via touch gestures, for example. The touch gestures are inputs to the human-machine interface of the eyewear device 100 to perform specific actions in applications executing on the eyewear device 100 or to navigate through displayed images in an intuitive manner which enhances and simplifies the user experience. Fingerprint sensor 113 can receive user input commands (e.g., finger contacts) as input and the sensing circuit 241 when controlled by the gesture application 852 can track those finger contacts and identify particular input gestures. In one implementation, the identified gesture sends a user input signal to power up the low power processor 243A. In some examples, the fingerprint sensor 113 is located on different portions of the eyewear device 100, such as on a different temple, chunk, or the frame, but is electrically connected via a circuit board to the visible light camera 114, sensing circuit 241, image processor 812, image display driver 242, and image display of the optical assembly 180.

Fingerprint sensor 113 can enable several functions, for example, touching anywhere on the fingerprint sensor 113 may highlight an item on the screen of the image display of the optical assembly 180A-B. Double tapping on the fingerprint sensor 113 may select an item. Sliding (e.g., or swiping) a finger from front to back may slide or scroll in one direction, for example, to move to a previous video, image, page, or slide. Sliding the finger from back to front may slide or scroll in the opposite direction, for example, to move to a previous video, image, page, or slide. Pinching with two fingers may provide a zoom-in function to zoom in on content of a displayed image. Unpinching with two fingers provides a zoom-out function to zoom out of content of a displayed image. The fingerprint sensor 113 can be provided on both the left and right temples 125A-B to increase available functionality or on other components of the eyewear device 100, and in some examples, two, three, four, or more fingerprint sensors 113 can be incorporated into the eyewear device 100 in different locations.

Following are some examples, of finger gestures which can be identified by the API of the gesture application 852 and use cases. The API of the gesture application 852 can be configured to enable gestures to read, send, delete, and compose emails in the email application 848. The API of the gesture application 852 can be configured to enable gestures to select a contact or enter a phone number to place phone calls to in the phone application 849. After the user identification application 844 operates the fingerprint sensor 113 in user authorization mode and successfully authorizes the user, the gesture application 852 switches the fingerprint sensor 113 into navigation mode and the API can be configured to enable the authorized user's gestures to conduct banking transactions in the banking application 850. The API of the gesture application 852 can be configured to enable gestures to navigate the Internet in the web browser application 851. The API of the gesture application 852 can be configured to enable gestures to enter addresses or zoom in and out of maps and locations displayed in a turn-by-turn navigation application. The API of the gesture application 852 can be configured to enable gestures to view photos by swiping or select videos to view in a photo and video viewer application, including pause, stop, play, etc. The API of the gesture application 852 can be configured to enable gestures to select audio files to be played in the music player application, including pause, stop, play, etc.

An API call to the gesture application 852 can return identified finger gestures. In response to the identified finger gestures, the applications (e.g., 848-851) can adjust the image presented on the display based on the identified finger gesture. In some examples, the underlying detected touch events of the identified finger gesture may also be returned by the API call to the gesture application 852 to the applications (e.g., 848-851). This can allow for custom gestures to be developed and implemented in the applications (e.g., 848-851) for identification (e.g., via a software development kit) and resulting adjustments to images presented on the display based on the identified finger gesture.

In one example, interaction with the fingerprint sensor 113 by the user, e.g., tactile input can be processed by low power processor 243A as a request to capture a single image by the visible light camera 114. The tactile input for a first period of time may be processed by low-power processor 243A as a request to capture video data while the fingerprint sensor 113 is being contacted by a finger, and to cease video capture when no finger contact is detected on the fingerprint sensor 113, with the video captured while the fingerprint sensor 113 was continuously contacted stored as a single video file. In certain embodiments, the low-power processor 243A may have a threshold time period between the inputted touch gesture, such as 500 milliseconds or one second, below which the finger contact with the fingerprint sensor 113 is processed as an image request, and above which the finger contact with the fingerprint sensor 113 is interpreted as a video request. Image processor 812 includes circuitry to receive signals from the visible light camera 114 and process those signals from the visible light camera 114 into a format suitable for storage in the memory 1134.

FIG. 9 is a high-level functional block diagram of an example of a mobile device 890 that communicates via the fingerprint sensor system of FIG. 8. Shown are elements of a touch screen type of mobile device 890 having a user identification application 844 loaded, although other non-touch type mobile devices can be used in the user authorization communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 9 therefore provides a block diagram illustration of the example mobile device 890 having a touch screen display for displaying content and receiving user input as (or as part of) the user interface. Mobile device 890 also includes a camera(s) 970, such as visible light camera(s).

The activities that are the focus of discussions here typically involve data communications related to fingerprint scanning for user authorization and security in a portable eyewear device. As shown in FIG. 9, the mobile device 890 includes at least one digital transceiver (XCVR) 910, shown as WWAN XCVRs, for digital wireless communications via a wide area wireless mobile communication network. The mobile device 890 also includes additional digital or analog transceivers, such as short range XCVRs 920 for short-range network communication, such as via NFC, VLC, DECT, ZigBee, Bluetooth™, or WiFi. For example, short range XCVRs 920 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 890, the mobile device 890 can include a global positioning system (GPS) receiver. Alternatively, or additionally the mobile device 890 can utilize either or both the short range XCVRs 920 and WWAN XCVRs 910 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 920.

The transceivers 910, 920 (network communication interface) conforms to one or more of the various digital wireless communication standards utilized by modern mobile networks. Examples of WWAN transceivers 910 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 910, 920 provide two-way wireless communication of information including digitized audio signals, still image and video signals, web page information for display as well as web related inputs, and various types of mobile message communications to/from the mobile device 890 for user authorization strategies.

Several of these types of communications through the transceivers 910, 920 and a network, as discussed previously, relate to protocols and procedures in support of communications with the eyewear device or the server system for user identity verification utilizing fingerprint sensors, e.g., capacitive, optical, ultrasonic, etc., to digitize and process images of the fingerprint. Such communications, for example, may transport packet data via the short range XCVRs 920 over the wireless connections 825 and 837 to and from the eyewear device 100 as shown in FIG. 8. Such communications, for example, may also transport data utilizing IP packet data transport via the WWAN XCVRs 910 over the network (e.g., Internet) 895 shown in FIG. 8. Both WWAN XCVRs 910 and short range XCVRs 920 connect through radio frequency (RF) send-and-receive amplifiers (not shown) to an associated antenna (not shown).

The mobile device 890 further includes a microprocessor, shown as CPU 930, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 930, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 930 or processor hardware in smartphone, laptop computer, and tablet.

The microprocessor 930 serves as a programmable host controller for the mobile device 890 by configuring the mobile device 890 to perform various operations, for example, in accordance with instructions or programming executable by processor 930. For example, such operations may include various general operations of the mobile device, as well as operations related to user authorization and communications with the eyewear device 100 and server system 898. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 940A and a random access memory (RAM) 940B. The RAM 940B serves as short term storage for instructions and data being handled by the processor 930, e.g. as a working data processing memory. The flash memory 940A typically provides longer term storage.

Hence, in the example of mobile device 890, the flash memory 940A is used to store programming or instructions for execution by the processor 930. Depending on the type of device, the mobile device 890 stores and runs a mobile operating system through which specific applications, including user identification application 844. Applications, such as the user identification application 844, may be a native application, a hybrid application, or a web application (e.g., a dynamic web page executed by a web browser) that runs on mobile device 890 to authorize the user. Examples of mobile operating systems include Google Android, Apple iOS (I-Phone or iPad devices), Windows Mobile, Amazon Fire OS, RIM BlackBerry operating system, or the like. User identification application 844 includes programming functions to populate the database of captured fingerprint templates of multiple users 845 and to authorize the user. The programming functions may include comparing the extracted fingerprint features 792 with the database of captured fingerprint templates of multiple users 845.

As shown, flash memory 940A storage device stores a database of captured fingerprint templates of multiple users 845. The database of captured fingerprint templates of multiple users 845 is accumulated over time as different users of the eyewear device 100 set up a profile in the user identification system. Initially, each user utilizes the fingerprint sensor 113 to generate a fingerprint image 779 having that user's tracked patterns of fingerprint ridges. The user's fingerprint features are extracted from the generated fingerprint image 779; and the extracted fingerprint features 792 are converted into a captured fingerprint template (a derived format, such as a unique histogram, checksum, etc. including the salient fingerprint features or just the raw fingerprint image 779 itself which can be encrypted). The captured fingerprint templates are populated into the database of captured fingerprint templates of multiple users 845 to allow for user identification during subsequent use.

In the example, the eyewear device 100 generates a fingerprint image 779 and transmits the fingerprint image 779 to the mobile device 890. The mobile device 890 stores the fingerprint image 779 in flash memory 940A, extracts fingerprint features from the fingerprint image 779 and further stores the extracted fingerprint features 792 in flash memory 940A. To uniquely identify the user of the eyewear device 100, the extracted fingerprint features 792 are compared by the processor 930 against the database of captured fingerprint templates of multiple users 845 stored in the flash memory 940A. It will be understood that the mobile device 890 is just one type of host computer in the user identification system and that other arrangements may be utilized. For example, a server system 898 such as that shown in FIG. 8 may host the database of captured fingerprint templates of multiple users 845 and perform the comparison to make the unique user identification determination. Where the database of captured fingerprint templates of multiple users 845, fingerprint image 779, and extracted fingerprint features 792 are stored and processed can vary depending on the security preferences of the user and the system requirements.

Any of the fingerprint sensor, user authorization, navigation, or other functions described herein for the eyewear device 100, mobile device 890, and server system 898 can be embodied in on one or more methods as method steps or in one more applications as described previously. According to some embodiments, an "application" or "applications" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for the fingerprint sensor, user authorization, navigation, or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 898 or host computer of the service provider into the computer platforms of the eyewear device 100 and mobile device 890. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   an eyewear device including:
      a frame;
      an image display;
      a fingerprint sensor including an input surface to receive input of a finger skin surface; and
      a sensing circuit integrated into or connected to the fingerprint sensor, the sensing circuit configured to track a pattern of fingerprint ridges of the finger skin surface on the input surface;
   a processor coupled to the eyewear device and connected to the sensing circuit;
   a memory accessible to the processor; and
   programming in the memory, wherein execution of the programming by the processor configures the system to perform functions, including functions to:
      track, via the sensing circuit, the pattern of fingerprint ridges of the finger skin surface on the input surface;
      generate a fingerprint image having the tracked pattern of fingerprint ridges;
      extract fingerprint features from the fingerprint image;
      authorize the user to utilize the eyewear device based on the extracted fingerprint features by comparing the extracted fingerprint features against a database of captured fingerprint templates of multiple users to find a matching captured fingerprint template and authorizing the user to utilize the eyewear device in response to finding the matching captured fingerprint template, wherein each of the captured fingerprint templates corresponds to an account of a respective registered user of the eyewear device, the account of the respective registered user including at least one application access control for a respective application executed on the eyewear device, the at least one application access control to enable, disable, or restrict access to the respective application, the respective application including at least one of a chat application, a web browser, a navigation application, or an augmented reality application;
receive a gesture input on the fingerprint sensor;
display content on the image display; and
manipulate the displayed content on the image display to control the respective application.

2. The system of claim 1, wherein the function to authorize the user to utilize the eyewear device based on the extracted fingerprint features includes functions to:
determine an identity of the user in response to finding the matching captured fingerprint template; and
log the user into the eyewear device to unlock the eyewear device based on the determined identity of the user.

3. The system of claim 1, wherein:
the function to authorize the user to utilize the eyewear device based on the extracted fingerprint features includes functions to:
determine the account of the user including the at least one application access control; and
enable, disable, or restrict access to the respective application being executed on the eyewear device based on the at least one application access control.

4. The system of claim 2, wherein execution of the programming by the processor configures the eyewear device to perform functions, including functions to:
before authorizing the user to utilize the eyewear device, register the identity of the user with the eyewear device, wherein the register the identity of the user function includes additional functions to:
acquire the fingerprint image of the user;
preprocess the acquired fingerprint image to detect fingerprint features from the acquired fingerprint image; and
store the detected fingerprint features in the database of captured fingerprint templates as one of the captured fingerprint templates.

5. The system of claim 4, wherein the function to acquire the fingerprint image of the user includes additional functions to:
track, via the sensing circuit, the pattern of fingerprint ridges of the finger skin surface on the input surface; and
output the acquired fingerprint image having the pattern of fingerprint ridges.

6. The system of claim 4, wherein the detected fingerprint features from the acquired fingerprint image are fingerprint friction ridge details.

7. The system of claim 6, wherein the fingerprint friction ridge details include a minutiae point or a pore shape.

8. The system of claim 1, wherein:
the fingerprint sensor is configured to receive multiple finger contacts by different portions of a finger of a user, each of the different portions of the finger of the user corresponding to a different finger skin surface inputted at a different input time; and
the sensing circuit is further configured to track the pattern of fingerprint ridges of each of the multiple finger contacts, including location coordinates of the pattern of fingerprint ridges of each different finger skin surface inputted at the different input time.

9. The system of claim 8, wherein:
the function to receive on the input surface of the fingerprint sensor the finger skin surface inputted from the user includes to receive the multiple finger contacts by different portions of the finger of the user;
the function to track, via the sensing circuit, the pattern of fingerprint ridges of finger skin surface on the input surface includes to track the pattern of fingerprint ridges of each of the multiple finger contacts, including the location coordinates of the pattern of fingerprint ridges of each different finger skin surface inputted at the different input time; and
the function to generate the fingerprint image having the tracked pattern of fingerprint ridges includes additional functions to:
generate multiple fingerprint images to create a larger view of the finger of the user, each of the multiple fingerprint images corresponding to the tracked pattern of fingerprint ridges on each different finger skin surface inputted at the different input time; and
combine the tracked pattern of fingerprint ridges of each different finger skin surface inputted at the different input time from the multiple fingerprint images into an aggregate fingerprint image with the larger view of the finger of the user; and
the function to extract the fingerprint features extracts the fingerprint features from the aggregate fingerprint image.

10. The system of claim 9, wherein:
the fingerprint sensor tracks the location coordinates of the pattern of fingerprint ridges on a grid that forms a two-dimensional rectangular coordinate system to track X and Y axes of the pattern of fingerprint ridges on the fingerprint sensor.

11. The system of claim 1, further comprising:
a chunk integrated into or connected to the frame on the lateral side; and
a temple connected to the chunk;
wherein:
the fingerprint sensor includes a capacitive array, an optical scanner, or an ultrasonic scanner; and
the fingerprint sensor is connected to the frame, the temple, or the chunk.

12. The system of claim 11, wherein:
the frame, the temple, or the chunk includes a circuit board connected to the fingerprint sensor.

13. The system of claim 11, wherein the circuit board is a flexible printed circuit board.

14. The system of claim 13, wherein:
the fingerprint sensor includes the capacitive array;
the capacitive array is disposed on the flexible printed circuit board;
the capacitive array is formed of patterned conductive sensor electrodes;
the sensor electrodes are connected to the flexible printed circuit board;
the sensor electrodes are disposed below the input surface; and
the sensing circuit is connected to the sensor electrodes via at least one respective electrical interconnect and configured to measure capacitance changes of each of the sensor electrodes of the capacitive array to track the pattern of fingerprint ridges of the finger skin surface on the input surface.

15. The system of claim 12, wherein:
the fingerprint sensor includes the optical scanner;
the optical scanner includes:
- a light source connected to the frame, the temple, or the chunk, to emit light to illuminate the finger skin surface; and
- an image sensor connected to the frame, the temple, or the chunk, to capture an image of reflection variations of the emitted light on the fingerprint ridges of the finger skin surface;

wherein execution of the programming by the processor configures the system to perform functions, including functions to:
- emit, via the light source, the light to illuminate the finger skin surface; and
- capture, via the image sensor, the image of reflection variations of the emitted light on the fingerprint ridges of the finger skin surface.

16. The system of claim 12, wherein:
the fingerprint sensor includes the ultrasonic scanner;
the ultrasonic scanner includes:
- an ultrasonic emitter connected to the frame, the temple, or the chunk, to emit ultrasonic waves to strike the finger skin surface; and
- an ultrasonic receiver connected to the frame, the temple, or the chunk, to capture reflection variations of the emitted ultrasonic waves on the fingerprint ridges of the finger skin surface;

wherein execution of the programming by the processor configures the system to perform functions, including functions to:
- emit, via the ultrasonic emitter, the ultrasonic waves to strike the finger skin surface; and
- capture, via the ultrasonic receiver, the reflection variations of the emitted ultrasonic waves on the fingerprint ridges of the finger skin surface.

17. The system of claim 11, wherein:
the input surface of the fingerprint sensor is surrounded by a protruding ridge to indicate to the user an outside boundary of the input surface of the fingerprint sensor.

18. The system of claim 1, wherein:
the processor comprises a first processor and a second processor;
the memory comprises a first memory and a second memory;
the eyewear device includes:
- the first processor;
- the first memory; and
- programming in the first memory, wherein execution of the programming by the first processor configures the eyewear device to perform the functions to receive the pattern of fingerprint ridges, track the pattern of fingerprint ridges, and generate the fingerprint image; and the system further comprises a host computer coupled to the eyewear device via a network, the host computer including:
- the second processor;
- the second memory; and
- programming in the second memory, wherein execution of the programming by the second processor configures the host computer to perform the function to authorize the user to utilize the eyewear device.

19. The system of claim 18, wherein:
the host computer is a mobile device;
the network is a wireless short-range network or a wireless local area network;
the host computer includes a storage device having the database of captured fingerprint templates of multiple users; and
the host computer functions to authorize the user to utilize the eyewear device includes functions to:
- compare the extracted fingerprint features against the database of captured fingerprint templates of multiple users to find a matching captured fingerprint template; and
- authorize the user to utilize the eyewear device in response to finding the matching captured fingerprint template.

* * * * *